US011663749B2

(12) United States Patent
Scerra et al.

(10) Patent No.: US 11,663,749 B2
(45) Date of Patent: May 30, 2023

(54) PROVIDING CONTEXT FOR SOFTWARE DEPLOYMENTS USING AUGMENTED REALITY

(71) Applicant: Red Hat, Inc., Raleigh, NC (US)

(72) Inventors: Adam Scerra, Westford, MA (US); Alexander Braverman Masis, Ra'anana (IL); Kedar Vijay Kulkarni, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 166 days.

(21) Appl. No.: 17/171,649

(22) Filed: Feb. 9, 2021

(65) Prior Publication Data
US 2022/0254072 A1    Aug. 11, 2022

(51) Int. Cl.
*G06T 11/00*      (2006.01)
*G06F 3/01*       (2006.01)
(Continued)

(52) U.S. Cl.
CPC .............. *G06T 11/00* (2013.01); *G06F 3/011* (2013.01); *G06F 3/0481* (2013.01);
(Continued)

(58) Field of Classification Search
CPC ...... G06T 11/00; G06T 2200/24; G06F 3/011; G06F 3/0481; G06F 3/04842; G06F 8/60; G06K 7/10366; G06K 7/1413
See application file for complete search history.

(56) References Cited

U.S. PATENT DOCUMENTS

| 2006/0048141 A1* | 3/2006 | Persson ..................... G06F 8/61 |
| | | 717/176 |
| 2012/0249588 A1 | 10/2012 | Tison et al. |

(Continued)

FOREIGN PATENT DOCUMENTS

GB        2460433 A  * 12/2009  ............. G06F 21/34

OTHER PUBLICATIONS

Eric Brabänder, Virtual Reality and Augmented Reality in the Data Center, Jul. 2016.
(Continued)

*Primary Examiner* — William A Beutel
(74) *Attorney, Agent, or Firm* — K&L Gates LLP

(57) ABSTRACT

Systems and methods are described for providing context for software deployment using augmented reality. In an example method, an augmented reality (AR) device having one or more processors may receive a set of compatibility requirements for deployment of a computer executable program (e.g., a software). A camera may acquire image data of a first video showing one or more computing devices. A respective device identifier corresponding to each computing device may be determined. Based on each device identifiers, a respective device specification may be received for each computing device. The set of compatibility requirements may be compared with each of the device specifications. The AR device may generate one or more annotation labels indicating a respective compatibility value for each computing device. Furthermore, the AR device may generate, in real time, an augmented video by mapping the annotation labels to the computing devices.

18 Claims, 9 Drawing Sheets

(51) Int. Cl.
  *G06F 3/04842* (2022.01)
  *G06F 3/0481* (2022.01)
  *G06K 7/14* (2006.01)
  *G06K 7/10* (2006.01)
  *G06F 8/60* (2018.01)
  *G06F 9/445* (2018.01)

(52) U.S. Cl.
  CPC ............ *G06F 3/04842* (2013.01); *G06F 8/60* (2013.01); *G06K 7/10366* (2013.01); *G06K 7/1413* (2013.01); *G06F 9/44526* (2013.01); *G06T 2200/24* (2013.01)

(56) References Cited

U.S. PATENT DOCUMENTS

| | | | | |
|---|---|---|---|---|
| 2014/0351408 | A1* | 11/2014 | Anderson | H04L 41/0686 709/224 |
| 2015/0317235 | A1* | 11/2015 | Lachambre | G06F 11/3612 717/126 |
| 2019/0101756 | A1* | 4/2019 | Todeschini | G06K 7/10722 |
| 2020/0252276 | A1* | 8/2020 | Lairsey | H04L 41/0813 |

OTHER PUBLICATIONS

Dell EMC, Understanding Augmented Reality Monitoring in OpenManage Mobile, Oct. 2019.

* cited by examiner

PROVIDING CONTEXT FOR SOFTWARE DEPLOYMENTS USING AUGMENTED REALITY

BACKGROUND

Software is often deployed on various computing systems and hardware. However, the deployment can fail for a number of reasons, and identifying the cause for this failure can be a tedious process. For at least these reasons, software users are often burdened with determining whether a specific computing device is compatible with a software. The process may involve identifying the specification and capabilities of the hardware, and preparing a method for deploying the software, before performing the actual operation of running the software.

SUMMARY

The present disclosure provides new and innovative systems and methods for providing context for software deployment using augmented reality. In an example, a method performed by an augmented reality (AR) device having one or more processors may include receiving a set of compatibility requirements for deployment of a computer executable program (e.g., a software). The AR device may acquire, using a camera, first image data of a first video showing one or more computing devices. A respective device identifier corresponding to each computing device may be determined. Based on the respective device identifier of each computing device, a respective device specification for each computing device may be received. The set of compatibility requirements for the computer executable program may be compared with each of the device specifications. The AR device may determine, based on each comparison, a respective compatibility value of each computing device, and may generate one or more annotation labels indicating the respective compatibility value for each computing device. Furthermore, the AR device may generate, in real time based on the image data, an augmented video by mapping the one or more annotation labels to one or more visual spaces of the corresponding one or more computing devices.

In an example, a system includes an augmented reality (AR) device comprising a camera, a graphical user interface (GUI), memory, and one or more processors in communication with the memory. The memory may store instructions that, when executed by the one or more processors, may cause the AR device to acquire, via the camera, image data of a video showing one or more computing devices. When executed, the instructions may cause the AR device to provide, via the GUI, an option to deploy one or more computer executable programs into any of the one or more computing devices. The instructions, when executed, may cause the AR device to receive, via the GUI, a request to deploy a first computer executable program of the one or more computer executable programs into a first computing device of the one or more computing devices. The first computer executable program may be associated with a set of compatibility requirements. When executed, the instructions may cause the AR device to display, in real-time, an augmented video showing a progress of deployment of the computing executable program into the first computing device. Furthermore, the instructions, when executed, may cause the AR device to determine that the first computing device fails to satisfy the set of compatibility requirements. Thus, the instructions, when executed, may cause the AR device to display, in real-time on the augmented video, an indication that the deployment has failed.

In an example, a non-transitory computer-readable medium for use on a computer system (e.g., an augmented reality (AR) device) containing computer-executable programming instructions for performing a method of assessing hardware compatibility in real time using an AR device. The method may include receiving a set of compatibility requirements for deployment of a computer executable program. The method may further include acquiring image data of a video showing one or more computing devices may be acquired using a camera. Furthermore, one or more device identifiers corresponding to the one or more computing devices may be received. Based on the one or more device identifiers, one or more device specifications corresponding to the one or more computing devices may also be received. The method may further include determining, based on a comparison between the set of compatibility requirements with each of the one or more device specifications, a respective compatibility value of each computing device. The method may further include generating one or more annotation labels corresponding to each computing device. Each annotation label may indicate the respective compatibility value for each corresponding computing device. The method may also include generating, in real time based on the image data, an augmented video by mapping the one or more annotation labels to one or more visual spaces of the corresponding one or more computing devices.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
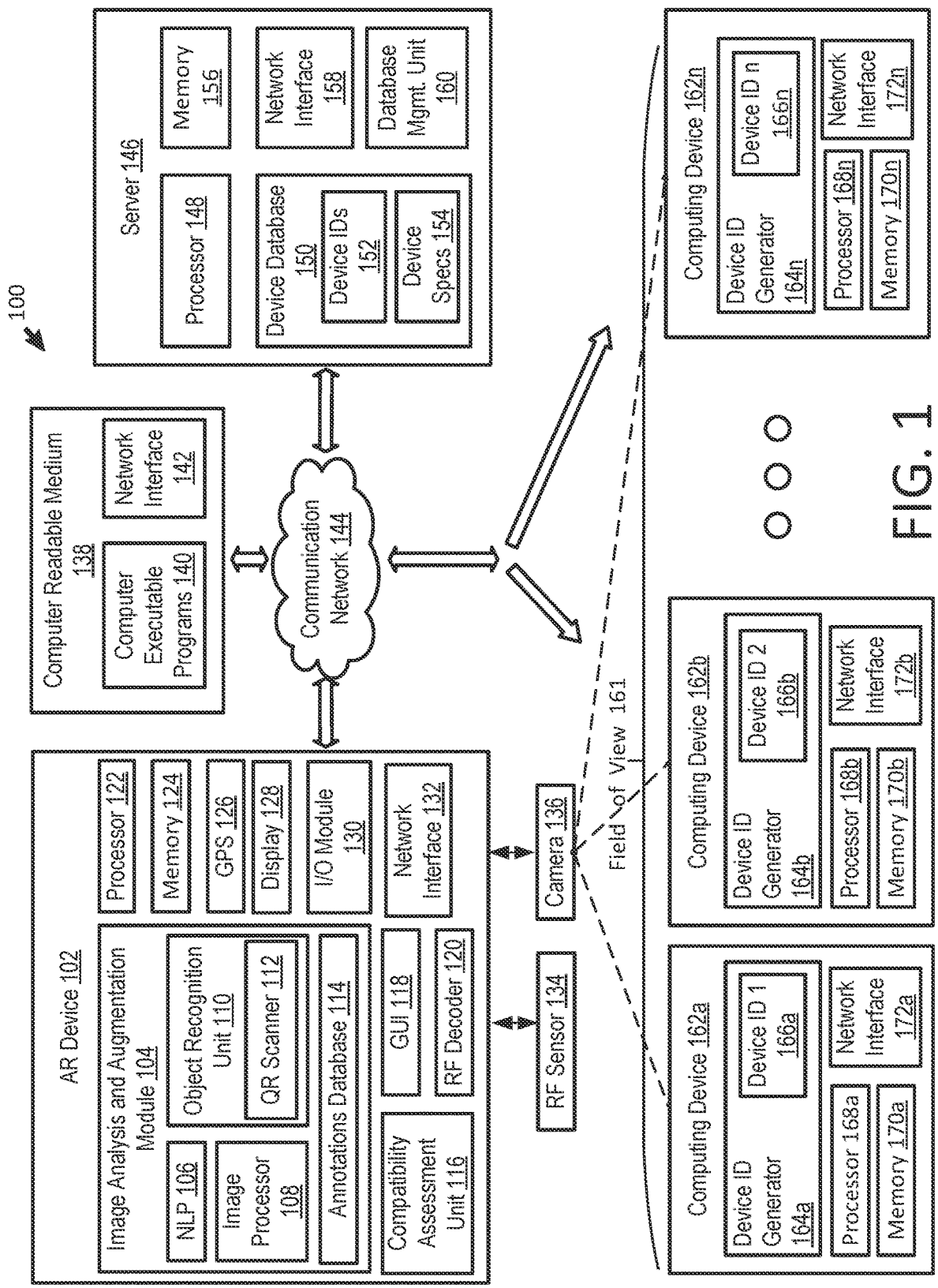
FIG. 1 illustrates a block diagram of an example computer network environment for providing context for software deployments using augmented reality, according to an example embodiment of the present disclosure.

It is often difficult to deploy software applications and programs to hardware. An intended target hardware may not have the exact specifications to be compatible for the software. This problem is especially compounded in settings where software deployment needs to occur over a plurality of hardware devices being managed by a remote server. The plurality of hardware devices may require frequent maintenance. It may be difficult to track compatibility information for a large number of hardware devices, and to identify the right hardware for a software deployment.

Even if a software can be installed, a hardware may not have enough resources to run specific workloads of the software after its installation. Alternatively, an intended target hardware may have more resources than was initially thought, and the hardware may be underutilized after a software has been deployed to it. Thus, there is a need to consolidate information needed to make the correct decisions with respect to resource allocation at the time of deployment and/or to determine the feasibility of running software beyond installation.

Furthermore, the process of successfully deploying software into a hardware that is compatible may not only involve finding a hardware that meets the compatibility requirements for the software (e.g., capabilities, space availability, etc.), but also planning for a method of deployment (e.g., a manual deployment, an automatic deployment, a virtual deployment, etc.), performing any necessary preparations for the deployment (e.g., device updates, configuration changes, etc.). In addition, the actual operation of the software deployment may typically include actions performed remotely (e.g., at a remote server) and locally (e.g., at the hardware). Thus, there is also a desire and need to streamline the process of successfully deploying a hardware, which is less burdensome from a user perspective.

The present disclosure provides novel and non-obvious methods and systems for addressing the above-described shortcomings, needs, and desires. For example, the present disclosure describes augmented reality (AR) devices that provide context for a software deployment or a planned software deployment on one or more hardware devices. The context is intuitive for a user to understand, and may include information and operations needed for a successful deployment. When a user views hardware through the lens of an augmented reality device, the user may be able to see, as annotations in an augmented video, various characteristics associated with the hardware, including, e.g., its specifications, its current status, its compatibility with a specific software, and deployment options. The visual aid can help the user assess whether or not to deploy a software, and to which hardware device among a plurality of hardware devices. After a user decides, the user may identify a desired software for deployment, a desired target hardware device, and pick and execute a desired software deployment option. The user may make these decisions through an augmented reality platform, while the user viewing the actual hardware, or a visual model of the actual hardware. The augmented reality may reduce the time and actions required to identify and perform the deployment, and may increase the utilization of any projected or real workload.

FIG. 1 illustrates a block diagram of an example computer network environment 100 for providing context for software deployments using augmented reality, according to an example embodiment of the present disclosure. The network environment 100 may include an augmented reality (AR) device 102, a computer readable medium 138, a server 146, and one or more computing devices 162a-162n. One or more of these components may be able to communicate with one another over a communication network 144. As will be described, these components may be used to provide context for software deployment using augmented reality. For example, at a high level, a user intending to deploy a software (e.g., a computer executable program 140) stored in computer readable medium 138) in one of the computing devices 162a-n may assess which of the computing devices 162a-n is compatible with the software. The user may use the AR device 102 to view the computing devices 162a-162n (e.g., through a camera 136), and see an augmented video that indicates compatibility information for each computing device. Armed with this information, the user may select to deploy the software to an appropriate computing device using the AR device 102. Based on the selection, the server 146 may cause the software to be deployed to the selected computing device.

The AR device 102 may comprise a portable computing device (e.g., a mobile device, personal digital assistant, laptop, tablet computers, smart camera, etc.) and/or a wearable computing device (e.g., a virtual reality headset (e.g., the OCULUS VR), smart glasses, etc.) have one or more of the subcomponents described herein for generating an augmented or mixed reality for a user to perform the functions described herein. The AR device 102 may include, for example, an image analysis and augmentation module 104, a compatibility assessment unit 116, a graphical user interface (GUI) 118, a processor 122, memory 124, a global positioning system (GPS) 126, a display 128, an input output (I/O) module 130, and a network interface 132. The AR device 102 may comprise, or at least be communicatively linked to, a camera 136 to capture a field of view (e.g., to generate and/or augment a video).

In some embodiments, the AR device 102 may comprise, or at least be communicatively linked to, a radiofrequency (RF) sensor 134. The RF sensor 134 may be used to detect radio frequencies emitted from the one or more computing devices 162a-162n, as will be described herein. In such embodiments, the AR device 102 may further comprise an RF decoder 120 that may be used to decode and/or decrypt radiofrequencies received from the one or more computing devices 162a-162n, e.g., to determine their respective device identifications.

The image analysis and augmentation module 104 may comprise subcomponents involved with processing image data received by the AR device 102 (e.g., via camera 136), and generating an augmented video. For example, an image processor 106 may digitally process image data to avoid noise and other artifacts, and prepare such image data for the recognition of texts and physical objects. The object recognition unit 110 may recognize physical objects (e.g., computing devices) from the received image data, and mapping of visual space corresponding to the physical objects. In some aspects, the physical objects may correspond to quick response (QR) codes or other two or three dimensional bar codes within the field of view. In such aspects, the object recognition unit 110 may comprise a QR scanner to detect image data corresponding to the QR code. In some aspects, a natural language processor 106 may be used to recognize texts, and determine meaning from texts captured from the field of view. The texts may be visible from the computing devices captured in the field of view and may be used to identify the individual computing devices. The image analysis and augmentation module 104 may further comprise an annotations database 114, which may store a repository of labels that can be used to annotate various physical objects recognized from the image data. For example, labels may indicate the specifications of computing devices recognized from the image data. The labels may comprise additional image data that may replace, complement, and/or overlay a visual space of a recognized physical object. Labels within the annotations database 114 may be periodically created, replaced, updated, or destroyed.

The compatibility assessment unit 116 may comprise a program, application, plug-in, or code to assess whether an identified computing device or hardware is compatible with a software (e.g., computer executable program 140) for deployment. In some aspects, after an AR device 102 identifies one or more computing devices 162a-162n from a field of view, the compatibility assessment unit 116 may compare their respective device specifications with a set of compatibility requirements for a software to be deployed. The compatibility assessment unit 116 may then generate a compatibility value for each computing device based on that comparison.

The GUI 118 may comprise a touch-sensitive display, a touchscreen, a keypad with a display device, or a combination thereof. The GUI 118 may allow a user to view a video output from the camera, view augmented video, and enter input signals, e.g., by touching and moving icons on the display (e.g., display 128).

The display 128 may comprise any medium of outputting visual information (e.g., image, video, etc.), such as real or augmented video generated by the AR device 102.

The processor 122 may comprise any one or more types of digital circuit configured to perform operations on a data stream, including functions described in the present disclosure.

The memory 124 may comprise any type of long term, short term, volatile, nonvolatile, or other memory and is not to be limited to any particular type of memory or number of memories, or type of media upon which memory is stored. The memory may store instructions that, when executed by the processor 122, can cause the AR device 102 to perform one or more methods discussed herein.

The GPS 126 may comprise any hardware, internal circuit, and/or associated program for geo-locating or geo-sensing the AR device 102, with possible assistance from an external server and antenna. For example, the GPS 126 may be used by the server 146 to track the location of the AR device 102, and then provide information to the AR device 102 regarding the one or more computing devices 162a-n near the tracked location.

The I/O module 130 may comprise any internal circuit used to facilitate communication between information processing subcomponents of the AR device 102 (e.g., processor 122, image analysis and augmentation module 104, compatibility assessment unit 116, etc.) and the subcomponents for receiving and/or outputting information (e.g., GUI 118, display 128, etc.).

The computer readable medium 138 may comprise any portable, local or remote storage of one or more computer executable programs 140. For example, the computer readable medium 138 may comprise a flash drive, a memory card, a hard disk, or the like. In some aspects, the computer readable medium 138 may be a subcomponent of, or otherwise communicatively linked to the AR device 102. Also or alternatively, the computer readable medium 138 may be an electronic storage device or a virtual storage location at a local or remote server, and the computer executable programs 140.

The computer executable programs 140 may comprise, any software code, unit, module, or program that is intended to be deployed to a computing device. Each computer executable program may have a set of compatibility requirements for it to be successfully deployed to a computing device.

The server 146 may comprise a local or a remote computing system for processing information received from the AR device (e.g., regarding detected objects from image data), retrieving data pertaining to the one or more computing devices 162a-n, facilitating device updates and file transfers, and storing and updating information pertaining to the one or more computing devices 162a-n. The server 146 may include one or more subcomponents that are similar to, or cognate with, the subcomponents of the AR device 102. For example, the server 146 may include a processor 146 for performing one or more functions described herein and a memory 156 for storing instructions that can be executed by the processor to perform the said functions.

The server 146 may further include a device database 150 for storing information for a plurality of computing devices (e.g., the one or more computing devices 162a-n). The information may include, for example, device identifications (IDs) 152 and device specifications 154. Furthermore, as each computing device may be associated with a unique device ID and a device specification, the stored Device IDs 152 may be linked to their corresponding device specifications 154 in the device database 150. The server 146 may further comprise a database management unit 160 for managing the database, such as via create, read, update, or delete (CRUD) functions. In some aspects, the device database 150 may be periodically updated by one or more devices of the computing network environment or by an external server.

Each of the one or more computing devices 162a-n may comprise any hardware, portion, or entirety of a computing system that may potentially be able to receive, install, and/or run a computer executable program (e.g., as in one of the computer executable programs 140). For example, the one or more computing devices 162a-n may comprise various servers within a lab facility, and may have varying device specifications, allowing for software to be deployed and tested in different computing systems. As shown in FIG. 1, the one or more computing devices 162a-n may fall within the field of view 161 of the camera 136. Each of the one or more computing devices 162a-n may include one or more subcomponents that are similar to, or cognate with, subcomponents previously described. For example, each computing device may include a processor (e.g., processors 168a-n) for performing one or more functions described herein (e.g., receiving and installing software, receiving and installing device updates, communicating with the server 146 and/or the AR device 102, etc.), and memory (e.g., memory 170a-n) for storing instructions that can be executed by the processor to perform the said functions. Each computing device may further include a device ID generator (e.g., device ID generator 164a-n) that can generate and/or indicate a unique device ID associated with the computing device (e.g., device ID 1 166A, device ID 2 166B, . . . device ID n 166n). The device ID may include, for example, an IP address, a MAC address, a local or private network address, and the like.

In some aspects, the device ID may comprise a two dimensional or three-dimensional bar code (e.g., a quick read (QR) code) that can be displayed with or without a device ID generator. In a further aspect, the device ID may comprise a unique radiofrequency identification (RFID) associated with the corresponding computing device, and the device ID generator may be a device used to transmit the unique RFID.

The communication network 144 comprises wired and wireless networks. Examples of the wired networks may include a wide area network (WAN) or a local area network (LAN), a client-server network, a peer-to-peer network, and so forth. Examples of the wireless networks comprise Wi-Fi, a global system for mobile communications (GSM) network, and a general packet radio service (GPRS) network, an enhanced data GSM environment (EDGE) network, 802.5 communication networks, code division multiple access (CDMA) networks, Bluetooth networks or long term evolution (LTE) network, LTE-advanced (LTE-A) network or 5th generation (5G) network.

One or more devices of the computer network environment may each comprise a network interface (e.g., network interface 132, network interface 142, network interface 158, network interfaces 172a-172n, etc.) to allow the respective device to communicate with the communication network 144. For example, the respective network interface may comprise a wired interface (e.g., electrical, RF (via coax), optical (via fiber)), a wireless interface, a, modem, etc.

Figure 2:
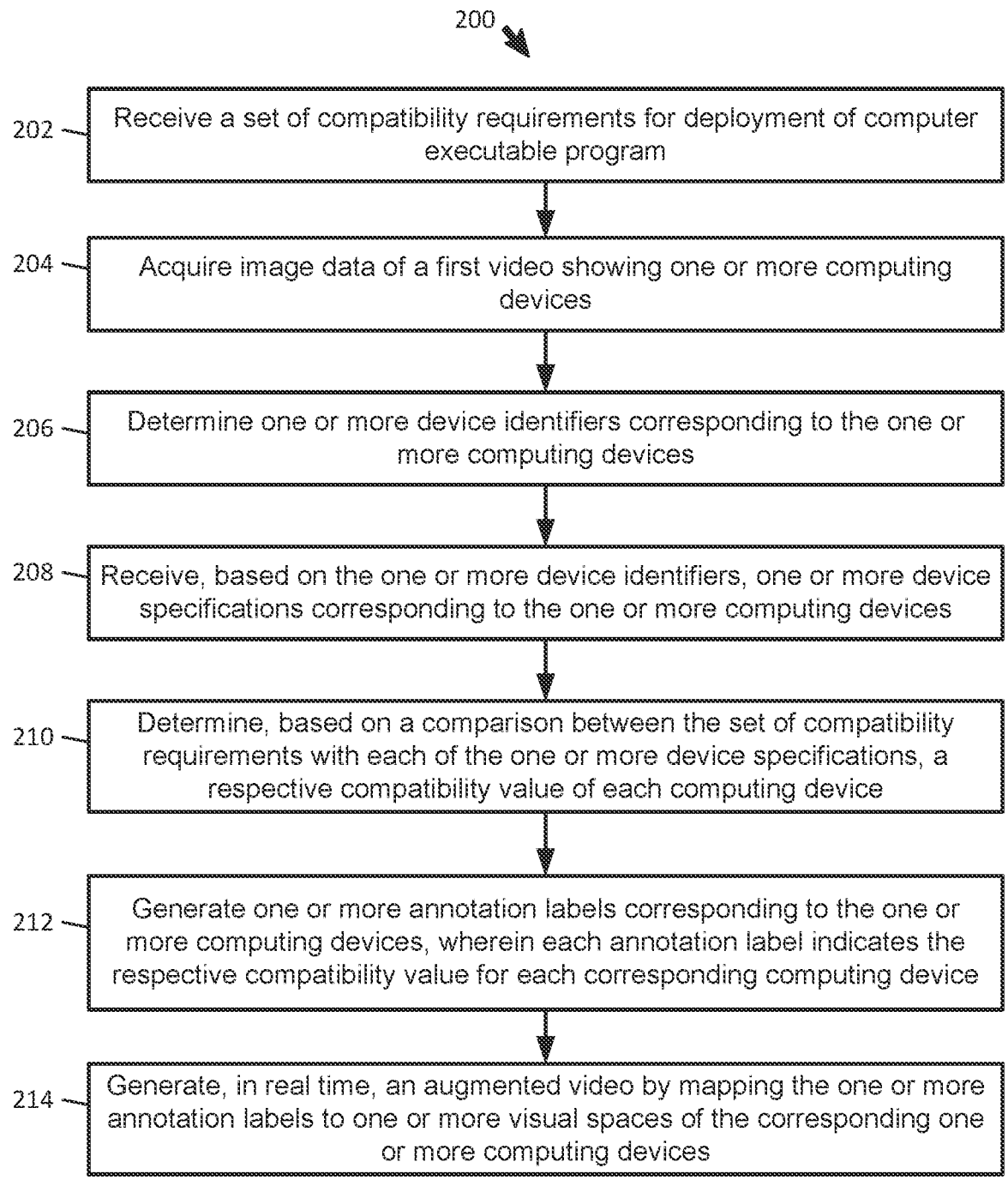
FIG. 2 illustrates a flowchart of an example process for providing context for software deployment using augmented reality according to an example embodiment of the present disclosure.

FIG. 2 illustrates a flowchart of an example process 200 for providing context for software deployment using augmented reality according to an example embodiment of the present disclosure. The process 200 may be performed by one or more processors of an augmented reality device used to capture image data and generate augmented image data (e.g., as in processor 122 of AR device 102). Although the example process 200 is described with reference to the flow diagram illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described may be optional.

Process 200 may begin with the AR device receiving a set of compatibility requirements for the deployment of a computer executable program (block 202). For example, the AR device 102 may receive, e.g., from the computer readable medium 138, a set of compatibility requirements associated with one or more computer executable programs 140. In some aspects (e.g., where the computer executable program is stored in the AR device itself), the set of compatibility requirements may be retrieved from the memory of the AR device itself. Also or alternatively, the set of compatibility requirements may be determined based on a specification of the computer executable program that is stored with the computer executable program, e.g., as metadata. The set of compatibility requirements, which may be unique to each computer executable program, may indicate the minimal requirements for a computing device for the computer executable program to be deployed to the computing device. For example, the set of compatibility requirements may include, but are not limited to: a processor speed requirement; a random access memory (RAM) requirement; a hard disk space requirement; a network adapter requirement, an audio or video capability requirement; a required plug-in, software, application, driver, operating system, etc. In some embodiments, there may be a different set of compatibility requirements for different types of computing devices (e.g., personal computers, handheld devices, servers, etc.)

The AR device may acquire image data of a first video showing one or more computing devices (block 204). For example, AR device 102 may acquire the image data based on a video captured by the camera 136 showing a field of view 161 comprising computing devices 162a, 162b, . . . and 162n.

The AR device may determine one or more device identifiers corresponding to the one or more computing devices (block 206). As discussed previously with respect to computing devices 1-n 162a-162n, each computing device may be associated with a unique device identification (e.g., a network address, IP address, MAC address, a radiofrequency identification, a barcode, etc.). Methods for determining the one or more device identifier may vary and may depend on the type of device identification.

In one example, the AR device (e.g., AR device 102) may detect network addresses of nearby devices (e.g., computing devices 162a, 162b . . . and 162n), and may associate the network addresses with the respective computing devices shown in the first video. For example, the AR device may use the detected network address (e.g., an IP address, a MAC address, etc.) to geo locate the respective computing device to a geographic location within the vicinity of the AR device. GPS and other geolocating modules within the respective computing devices may be used to indicate the location of each computing device. Also or alternatively, a server (e.g., server 146) may track the location of the AR device (e.g., AR device 102, via its GPS 126) and may provide the device identifications corresponding to computing devices near the location of the AR device (e.g., device ID 1 166a, device ID 2 166b, . . . and device ID 3 166n). The server (e.g., server 146) may maintain and/or periodically update a database of device IDs of computing devices and their respective locations (e.g., device database 150).

In a further example, the AR device may process the image data and recognize various objects that help to determine the device ID of each computing device in the field of view 161 of the one or more computing devices. For example, an image processor 108 of the AR device 102 may process the image data, and the object recognition unit 110 may identify various objects from the image data based on identifying features. In one aspect, QR codes displayed on the one or more computing devices may be recognized from the image data and may be scanned using the QR scanner 112 to decode a device ID corresponding to the computing device on which the QR code is displayed. Similar object recognition, scan, and decoding blocks may be implemented for other visible indicia on computing devices. In another aspect, computing devices may be recognized from the image data based on the aspect ratios of hardware, displays, and other discernible features of the computing devices. Logos, texts, physical sizes, and other visible features on the computing devices may be used to determine specific device IDs corresponding the computing device (e.g., with the help of NLP 106).

In a further embodiment, each computing device may transmit, via an RFID device (e.g., device ID generators 164a-n), a radiofrequency that decodes the device ID of the respective computing device. An RF sensor associated with the AR device (e.g., RF sensor 134) may receive the radiofrequency and decode it (e.g., via RF decoder 120) to determine the device ID.

The AR device may receive, based on the one or more device IDs, one or more device specifications that correspond to the one or more computing devices (block 208). For example, the AR device 102 may determine, from the respective device IDs 166a-n of each of the one or more computing devices 162*a*-162*n*, a respective device specification of each computing device. The device specification, which may be unique to each computing device, may comprise a technical description of components and capabilities associated with a computing device. Thus, the device specification may include, but are not limited to information pertaining to a processor (e.g., processor speed), random access memory (RAM), disk space (e.g., read only memory (ROM)), network adapters, and audio or video capabilities. In some aspects, the device specification may include a set of installed plug-ins, software, applications, drivers, operating systems, and/or platforms that the computing device may have, which may affect its ability to deploy or run external computer executable programs. In further aspects, the device specification may further include a set of software and hardware standards that a computing device is using, which determines its ability to deploy or run external computer executable programs.

In some embodiments, for example, where the AR device determines the device IDs based on detected network addresses of devices within the vicinity, the AR device may receive the device specifications by sending, to the one or more computing devices, and via a communication network, a request for the respective device specification of each computing device. Each computing device may send, and the AR device may receive, the respective device specification.

Also or alternatively, the AR device may transmit the one or more device identifiers to a server (e.g., server 146) that maintains a database of device specifications corresponding to computing devices identifiable by their device IDs (e.g., device database 150). The server may retrieve, from its database, the one or more device specifications corresponding to the one or more device IDs, and may send the one or more device specifications back to the AR device.

The AR device may determine a respective compatibility value of each computing device (block 210). The compatibility value for a given computing device value may be based on a comparison between the set of compatibility requirements with the respective device specification of the given computing device. For example, metrics for a required processor speed, RAM, hard disk space, network adapter, or an audio or video functionality for the computer executable program may be compared with the processor speed, RAM, hard disk space, network adapter, or audio or video functionalities already present within the computing device. The degree to which each of these requirements are fulfilled or superseded may be used to generate the compatibility value for the computing device.

The AR device may generate one or more annotation labels corresponding to the one or more computing devices (block 212). Each annotation label may indicate the respective compatibility value for each corresponding computing device. For example, a plurality of annotation labels may be saved in the annotations database 114 of AR device 102. A compatibility assessment unit 116 may generate a compatibility value for a planned deployment of the computer executable program 140 into a computing device 162*a*. The image analysis and augmentations module 104 may retrieve an annotation label indicating the specific compatibility value from the annotations database 114. As will be discussed further below, annotation labels may be color coded to indicate the level of compatibility between the computing device and the computer executable program that is intended to be deployed.

The AR device may generate an augmented video by mapping the one or more annotation labels to one or more visual spaces of the corresponding one or more computing devices (block 214). The visual spaces may correspond to the area within a field of view 161 that is occupied by the one or more computing devices. In some aspects, the visual space may be in proximity to the area occupied by the one or more computing devices. The augmented video may be generated in real-time based on the image data of the first video. For example, if a user is watching the first video through the AR device, the first video may seamlessly switch to the augmented video for the remainder of the viewing session. As will be described further herein, as a user views the augmented video, the user may be presented with options to deploy the computer executable program in any of the one or more computing devices, and/or cause a device update in any of the one or more computing devices.

Figure 3:
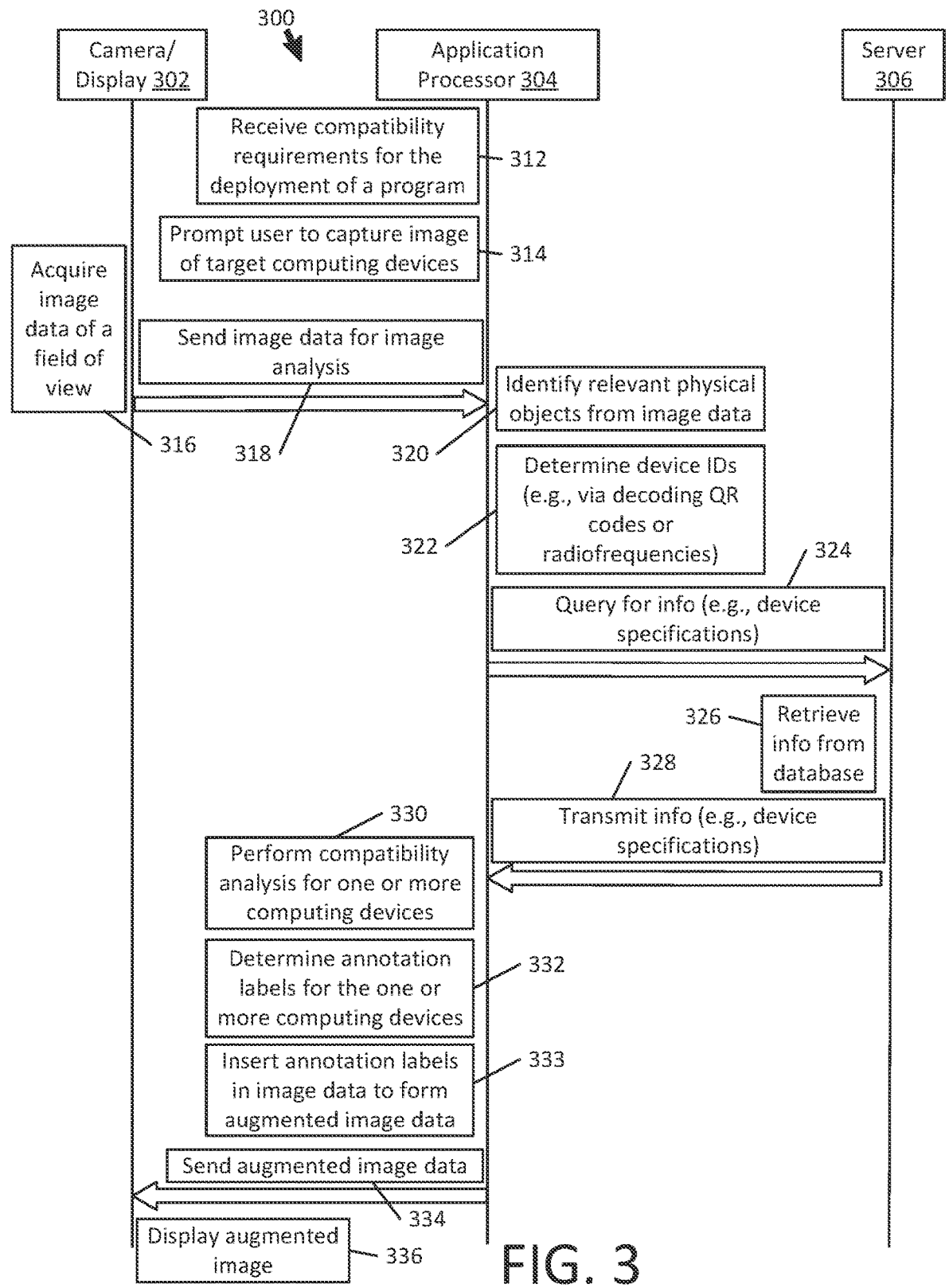
FIG. 3 illustrates a flow diagram of an example process for providing context for software deployment using augmented reality according to an example embodiment of the present disclosure.

FIG. 3 illustrates a flow diagram of an example process 300 for providing context for software deployment using augmented reality according to an example embodiment of the present disclosure. Although the example process 300 is described with reference to the flow diagram illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by various components and/or subcomponents of components of the example computing environment shown in FIG. 1. For example, one or more blocks of process 300 may be performed by a camera and its associated display ("camera/display" 302) of an augmented reality device (e.g., as in camera 136 and display 128 of the AR device 102). Another one or more blocks of process 300 may be performed by an application processor 304 of the AR device. For example, processor 122 and/or image processor 108 of the AR device 102 may perform one or more blocks associated with applications to analyze and augment videos, assessing compatibility, and receiving and transmitting information, and may serve as the application processor 304. Furthermore, as shown in FIG. 3, another one or more blocks of process 300 may be performed by server 306, which may be similar to server 146 in FIG. 1.

Process 300 may begin with the application processor 304 receiving compatibility requirements for the deployment of a program (block 312). As discussed previously in relation to block 202 in FIG. 2, the set of compatibility requirements may be received from the location of the program, and may indicate the minimal requirements for a computing device for the program to be deployed to the computing device.

Next, the application processor 304 may prompt a user of the AR device to capture an image or video of one or more target computing devices (block 314). For example, the user may receive, via GUI 118 of the AR device 102, a message asking the user to cause field of view 161 of the camera 136 to include the one or more computing devices 162*a*-*n* for which the user intends to assess the compatibility for deploying the software.

Then the user may cause the camera to acquire image data of a field of view 161 (block 316). The image data may be based on the user capturing an image, recording a video, or otherwise causing the camera to activate and capture a field of view 161 that shows the one or more computing devices.

The camera/display 302 may send the acquired image data to the application processor 304 for image analysis (e.g., at the image analysis and augmentation module 104 of the AR device 102) (block 318).

After receiving the image data, the application processor 304 may identify relevant physical objects from the image data (block 320). For example, identifying visual characteristics of computing devices (e.g., aspect ratios, logos, shapes, contrasts, textures, etc.) may be recognized and/or marked for further analysis. In some aspects, visual characteristics decoding or otherwise indicating a device ID, such as bar codes (e.g., QR codes) may be recognized from the image data. The physical location within the field of view 161 of the computing devices may be identified and marked, e.g., to indicate visual spaces for augmenting the video.

The application processor 304 may determine device IDs corresponding to the one or more computing devices (block 322). As previously discussed in relation to block 206, a device ID for a computing device may be determined through various methods previously described (e.g., detecting network addresses, decoding barcodes, decoding radiofrequencies, establishing communication with the computing device, etc.)

The application processor 304 may query the server 306 for information regarding the target computing devices (block 324). The information may include, for example, device specifications for the respective computing devices. As previously discussed, a device specification, which may be unique to each computing device, may comprise a technical description of components and capabilities associated with a computing device. The information may also include other capabilities of the target computing device that could be germane to software deployment and performance.

The server 306 may retrieve the information from its database (block 326). For example, a server such as server 146 may retrieve, from its database 150, device specifications corresponding to the target computing devices, e.g., using the device IDs of the target computing devices.

The information regarding the target computing devices may be transmitted back to the application processor 304 of the AR device (block 328). Communication between the server and the application processor 304 of the AR device may occur, for example, over communication network 144, and may be facilitated by network interfaces 132 and 158.

The application processor 304 may perform a compatibility analysis for the one or more target computing devices (block 330). For example, the application processor 304 may compare information that it received regarding the target computing devices (e.g., their respective device specifications) with the set of compatibility requirements for the deployment of the program. As previously discussed in relation to block 210 in FIG. 2, the compatibility analysis may involve the computation of a respective compatibility value for each target computing device indicating the compatibility of the software with each target computing device.

The application processor 304 may determine annotation labels for the one or more computing devices (block 332). As previously discussed in relation to block 212 in FIG. 2, the annotation labels may indicate a degree of compatibility of a target computing device with the software, e.g., to inform the user about the feasibility of deploying the software to the target computing device. Furthermore the annotation labels may be placed next to or on the visual space of the respective target computing devices, to form an augmented image data (block 333).

The augmented image data may be sent to the camera/display 302 (block 334). The camera/display may display an augmented image based on the augmented image data at 336. The process of outputting the augmented image may occur in real time, e.g., as the user acquires additional image data through the camera.

Figure 4:
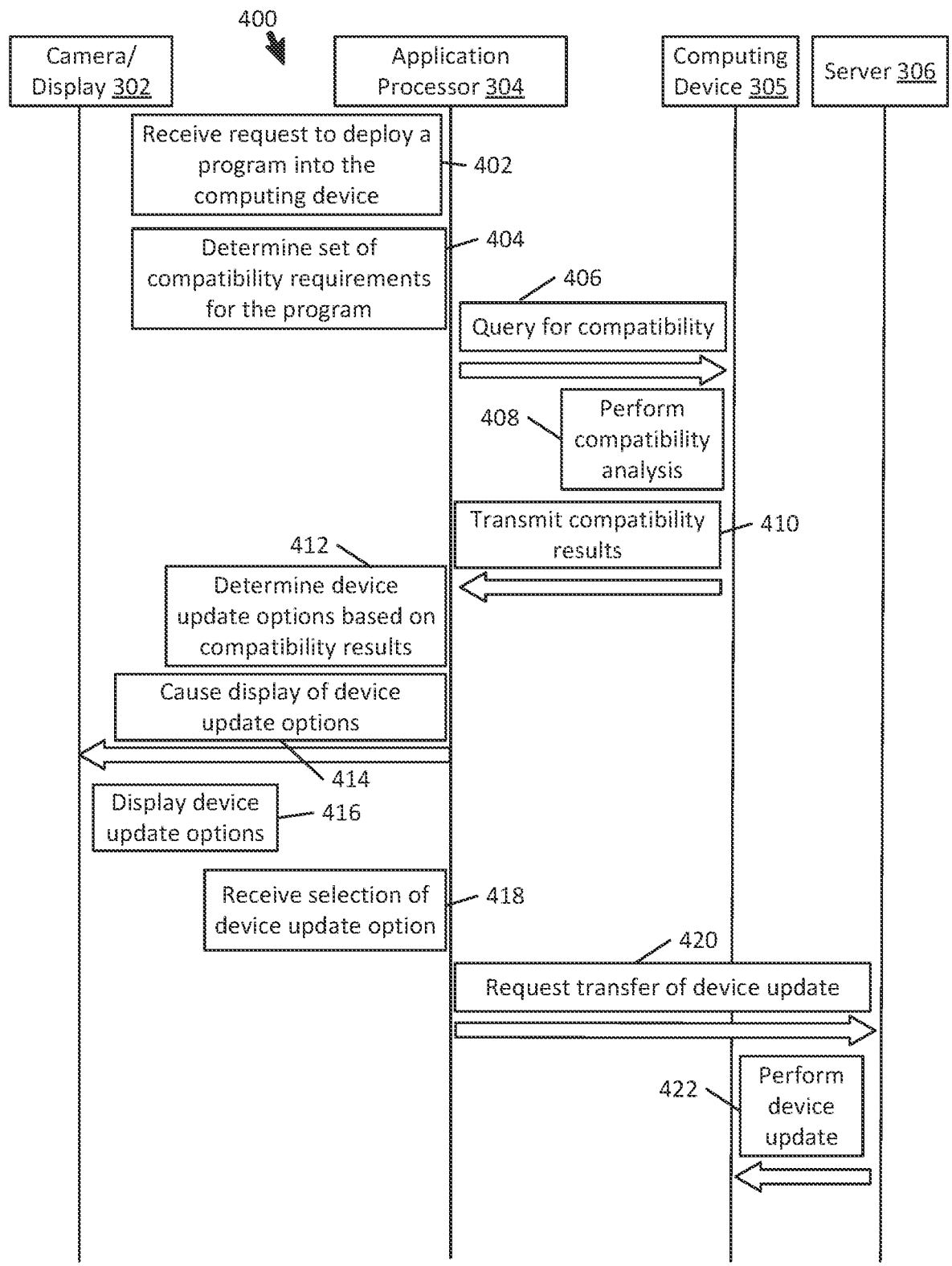
FIG. 4 illustrates a flow diagram of an example process for performing a device update for software deployment using augmented reality according to an example embodiment of the present disclosure.

FIG. 4 illustrates a flow diagram of an example process 400 for performing a device update for software deployment using augmented reality according to an example embodiment of the present disclosure. For example, if a user of the AR device 102 determines, after performing process 300 that a desired target computing device is not sufficiently compatible for a planned software deployment, process 400 can performed to perform a device update on the desired target computing device, e.g., to make it more compatible for the planned software deployment. Although the example process 400 is described with reference to the flow diagram illustrated in FIG. 4, it will be appreciated that many other methods of performing the acts associated with the process 400 may be used. For example, the order of some of the blocks may be changed, certain blocks may be combined with other blocks, blocks may be repeated, and some of the blocks described are optional. The process 400 may be performed by various components and/or subcomponents of components of the example computing environment shown in FIG. 1. For example, one or more blocks of process 400 may be performed by the previously discussed combination of camera/display 302 of an augmented reality device (e.g., as in camera 136 and display 128 of the AR device 102). Another one or more blocks of process 400 may be performed by the previously discussed application processor 304 of the AR device (e.g., such as processor 122 and/or image processor 108 of the AR device 102). Another one or more blocks of process 400 may be performed by a computing device 305 intended for the software deployment and/or the device update. For example, the computing device 305 may comprise one of the one or more computing devices 162a-n in FIG. 1. Furthermore, another one or more blocks of process 400 may be performed by the previously discussed server 306, which may be similar to server 146 in FIG. 1)

Process 400 may begin with the application processor 304 receiving a request to deploy a program into the computing device 305 (block 402). For example, a user that is viewing, via the AR device 102, video of the computing device 305 may desire to deploy a software on to the computing device 305. The user may enter, into the GUI 118 of the AR device 102, an input that indicates a command to deploy a selected program into the computing device 305. In some aspects, the user may have an option to select from many programs, and an option to select a target computing device (e.g., computing device 305) from many computing devices (e.g., computing devices 162a-n).

Next, the application processor 304 may determine the set of compatibility requirements for the program (block 404). One or more examples and methods for determining the set of compatibility requirements was previously described above in relation to block 202 in FIG. 2.

The application processor 304 may query the computing device 305 for its compatibility with the selected program (block 406). In some embodiments, as shown in FIG. 4, the computing device 305 may perform the compatibility analysis (block 408). For example, the computing device 305 may receive the set of compatibility requirements for the intended program, compare the set of compatibility requirements with its own device specification, and compute a compatibility value. Then the computing device 305 may transmit the compatibility results back to the application processor 304 (block 410).

Also or alternatively, the application processor 304 may perform the above described compatibility analysis, e.g., after receiving a device specification from the computing device 305.

The application processor 304 may determine device update options based on the compatibility results (block 412). For example, the application processor 304 may analyze the compatibility results to determine whether a metric of the device specification of the computing device 305 is below a requisite metric of the set of compatibility requirements for the program. For instance, a requisite metric of the set of compatibility requirements may require at least the capabilities of a specific version of an operating system (e.g., RED HAT® ENTERPRISE LINUX® 7.7) but the device specification of the computing device may indicate that the computing device has an older version of the operating system (e.g., RED HAT® ENTERPRISE LINUX® 8.1). If the metric concerns a software component of the computing device 305, the application processor 304 may identify the required update to the software component. Also or alternatively, the application processor 304 may determine that an installation of the software component is needed if the software component was previously missing from the computing device. The software component of a device specification that may lead to an insufficient compatibility value may include, for example, a driver, an application, an operating system, a plug-in, an add-on, a software, or a combination thereof.

The application processor 304 may cause the display of the device update options at the camera/display 302 (block 414). Thus, the camera/display 302 may display these device update options at block 416. The displaying of the device update options may occur in real time, e.g., as the user is viewing a video of the computing devices via the AR device 102. The device update options may inform the user of each of the determined device updates (including any proposed installation of missing software components) that may be needed to update the computing device 305. The display of the device update options may prompt the user to select a device update to be rendered to the computing device 305. In some aspects, the user may be able to render a device update to other computing devices shown in the augmented video. As will be discussed in more detail in relation to FIG. 8 below, the user may be able to select a device update on a GUI 118 of the AR device 102, as one of many options for identifying and interacting with the computing devices.

The application processor 304 may receive the selection of the device update option (block 418). Based on the device update option that is selected, the application processor may send, to the server 306, a request to perform a device update on the computing device (block 420). The request may identify the device update being requested (e.g., by identifying the relevant software component) and a network address, or other means of networking with, the computing device 305. The server 306 may be retrieve, from a database (e.g., device database 150), the requested device update. The server 306 may perform the device update on the computing device 305 (block 422).

Also or alternatively, the server 306 may establish communications with one or more other external servers (e.g., application program interface (API) servers for the software component associated with the requested device update) to access the device update file. In some aspects, the application processor 304 may directly send the request for performing the device update to these external servers. The external server may then directly perform the device update on the computing device 305.

Figure 5:
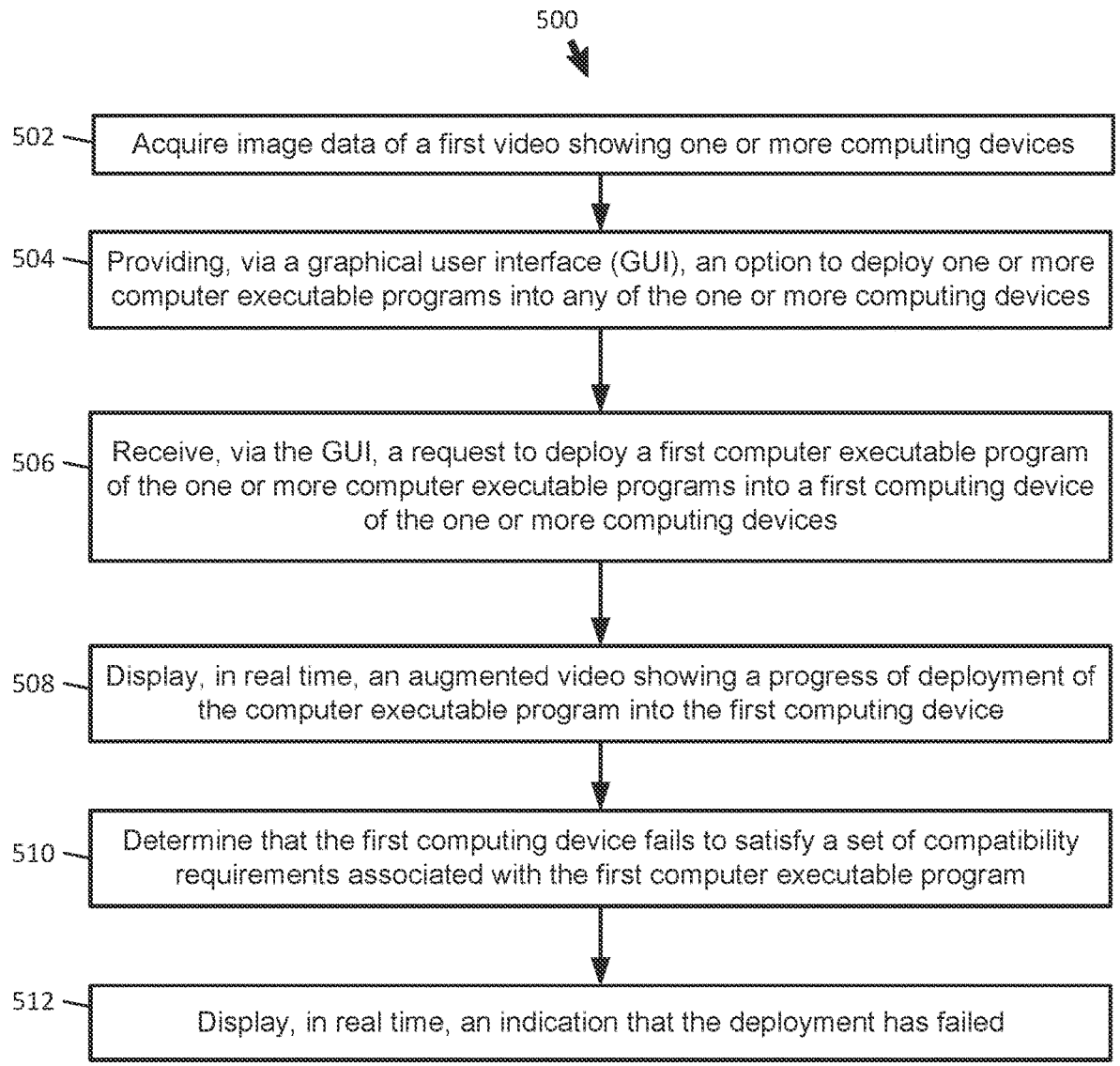
FIG. 5 illustrates a flowchart of an example process for initiating and assessing the status of a software deployment in real time using augmented reality, according to an example embodiment of the present disclosure.

FIG. 5 illustrates a flowchart of an example process 500 for initiating and assessing the status of a software deployment in real time using augmented reality, according to an example embodiment of the present disclosure. The process 500 may be performed by one or more processors of an augmented reality device used to virtually deploy software (e.g., as in AR device 102). Although the example process 500 is described with reference to the flow diagram illustrated in FIG. 5, it will be appreciated that many other methods of performing the acts associated with the method 500 may be used. For example, the order of some of the blocks may be changed, certain blocks may be combined with other blocks, blocks may be repeated, and some of the blocks described may be optional.

Process 500 may begin with the AR device acquiring image data of a first video showing one or more computing devices (block 502). For example, AR device 102 may acquire the image data based on a video captured by the camera 136 showing a field of view 161 comprising computing device 162*a*, 162*b* . . . and 162*n*.

Figure 8:
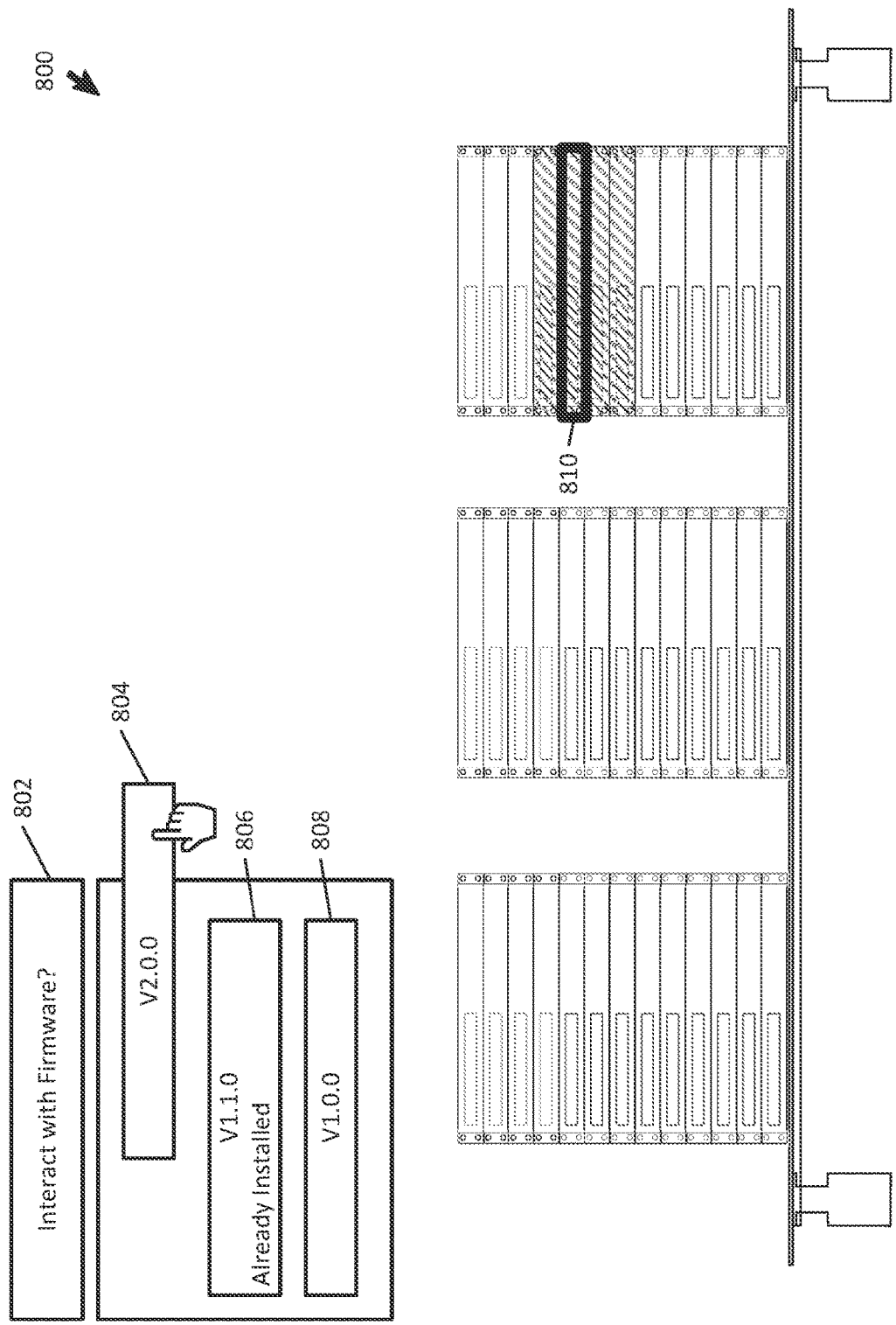

The AR device may provide an option to deploy one or more computer executable programs into any one or more computing devices (block 504). For example, the GUI 118 of AR device 102 may indicate, via the display 128, an icon, link, or button next to asking the user whether the user would like to deploy one or more computer executable programs 138, and a cursor or box to allow the user to pick a desired computing device of the one or more computing devices 162*a-n* in which to deploy the computer executable program. The options may be presented in real time, e.g., while the augmented video is being both captured and playing. FIG. 8, discussed further below, provides more details regarding an example of this block.

The AR device may receive a request to deploy a first computer executable program of the one or more computer executable programs into a first computing device of the one or more computing devices (block 506). For example, a user may use the GUI 118 of AR device 102 to select a specific computer executable program (e.g., a device update) by clicking on the name of the specific computer executable program shown on the augmented video. The user may then select computing device 162*a* ("first computing device") of the one or more computing devices 162*a-n* by moving a box to the selected computing device shown in the augmented video. In another example, the AR device 102 may receive, via the GUI 118 showing the augmented video, a signal caused by the user dragging a visual indicator of the first computer executable program (e.g., a transparent button) to a visual space of the first computing device. Based on the inputs (e.g., via a touch-sensitive device accessory, or controller associated with the AR device), the input/output module 130 may register these input signals as instructions for the processor to deploy a first computer executable program into the first computing device.

In some embodiments (for example, where the computer executable program is stored within the AR device 102), the AR device (e.g., AR device 102) may transmit the selected computer executable program to the first computing device (e.g., computing device 162*a*) via a communication network 144 for deployment.

In further embodiments, the AR device may cause a location of the selected computer executable program (e.g., computer readable medium 138, a local or remote server, etc.) to establish communications with the first computing device. For example, the device ID of the first computing device (e.g., device ID1 166*a*) may be sent to the location of the computer executable program for the computer executable program to be sent to the first computing device for deployment.

Also or alternatively, the preceding blocks of selecting a computer executable program to be deployed to the first computing device may be a simulated deployment, e.g., to plan the feasibility of a software deployment before any actual deployment.

The AR device may display, in real time, an augmented video showing a progress of deployment of the computer executable program into the first computing device (block 508). For example, the display 128 may show in real time, within the augmented video, a bar, graph, or other visual hovering over or next to the computing device and showing the progress of the deployment. The level of progress may be determined, in real-time based on communication with the computing device. For example, the AR device may ping the first computing device at periodic intervals to determine the level of progress. The deployment may be successful or may run into errors, e.g., based on how compatible the first computing device is with the computer executable program.

For example, the AR device may determine that the first computing device fails to satisfy a set of compatibility requirements associated with the first computer executable program (block 510). In one aspect, the AR device may identify the set of compatibility requirements of the selected computer executable program, determine the device specification of the first computing device, and generate a compatibility value (e.g., using methods described in relation to FIG. 2). Also or alternatively, the determination of whether the first computing device satisfies the set of compatibility requirements may be performed at a server, and the AR device may receive the result of, and/or an indication of, the determination from the server.

In another aspect, an assessment of which computing devices satisfy the set of compatibility requirements for a given computer executable program may be performed before options to deploy the computer executable program is provided. For example, computing devices that fail to satisfy the set of compatibility requirements may not be available as options in which to deploy the computer executable program.

The AR device may display, in real-time, an indication that the deployment has failed (block 512). In some aspects, reasons for the failure to deploy may be provided. For example, a user desiring to know why a software failed to deploy in the first computing device may select an option, via GUI 118, to view the cause for the failure (e.g., by way of an error log). The cause may then be displayed to the user via display 128.

Figure 6:
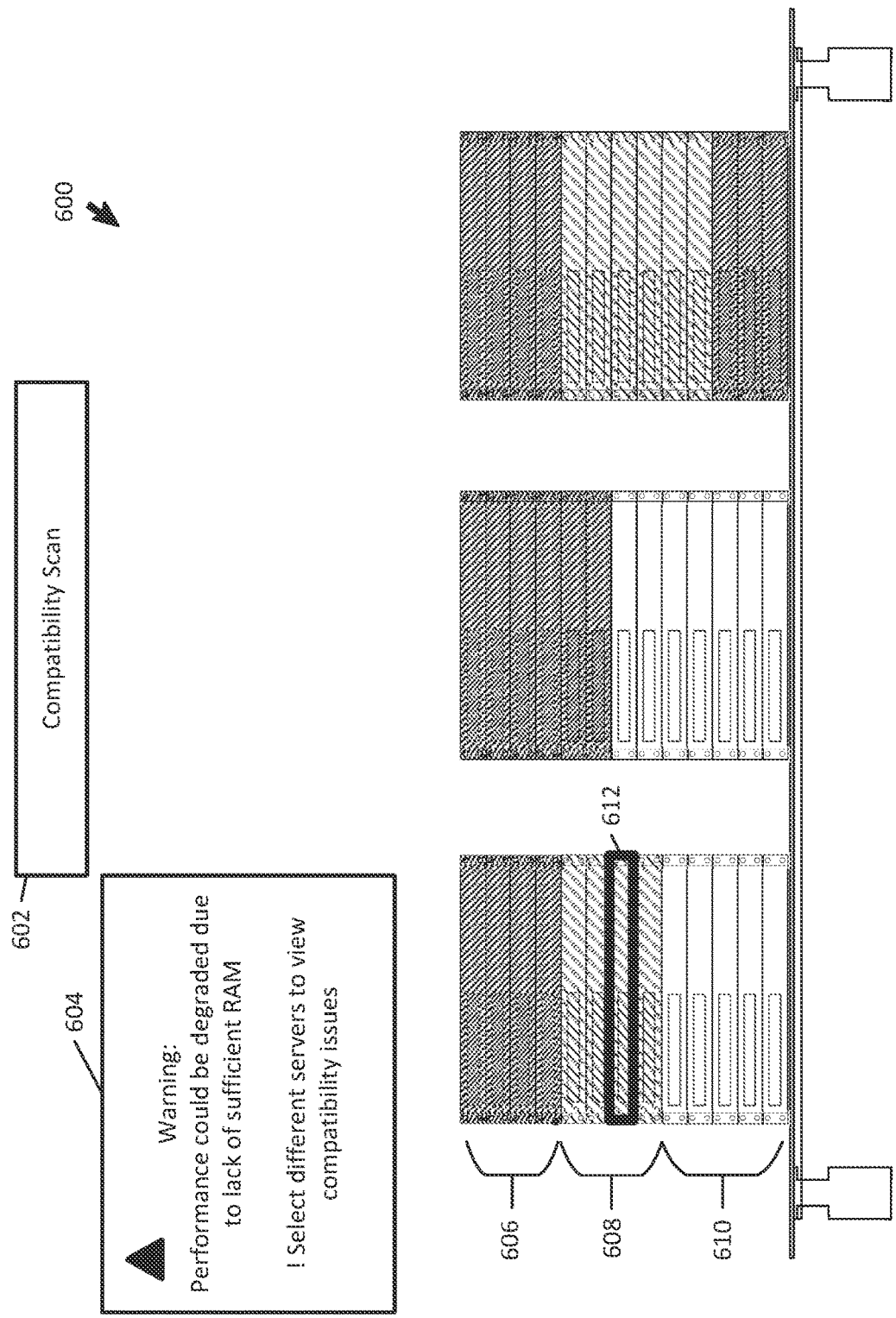
FIGS. 6-8 illustrate screenshots of a graphic user interface associated with an example augmented reality device, according to an example embodiment of the present disclosure.
Figure 7:
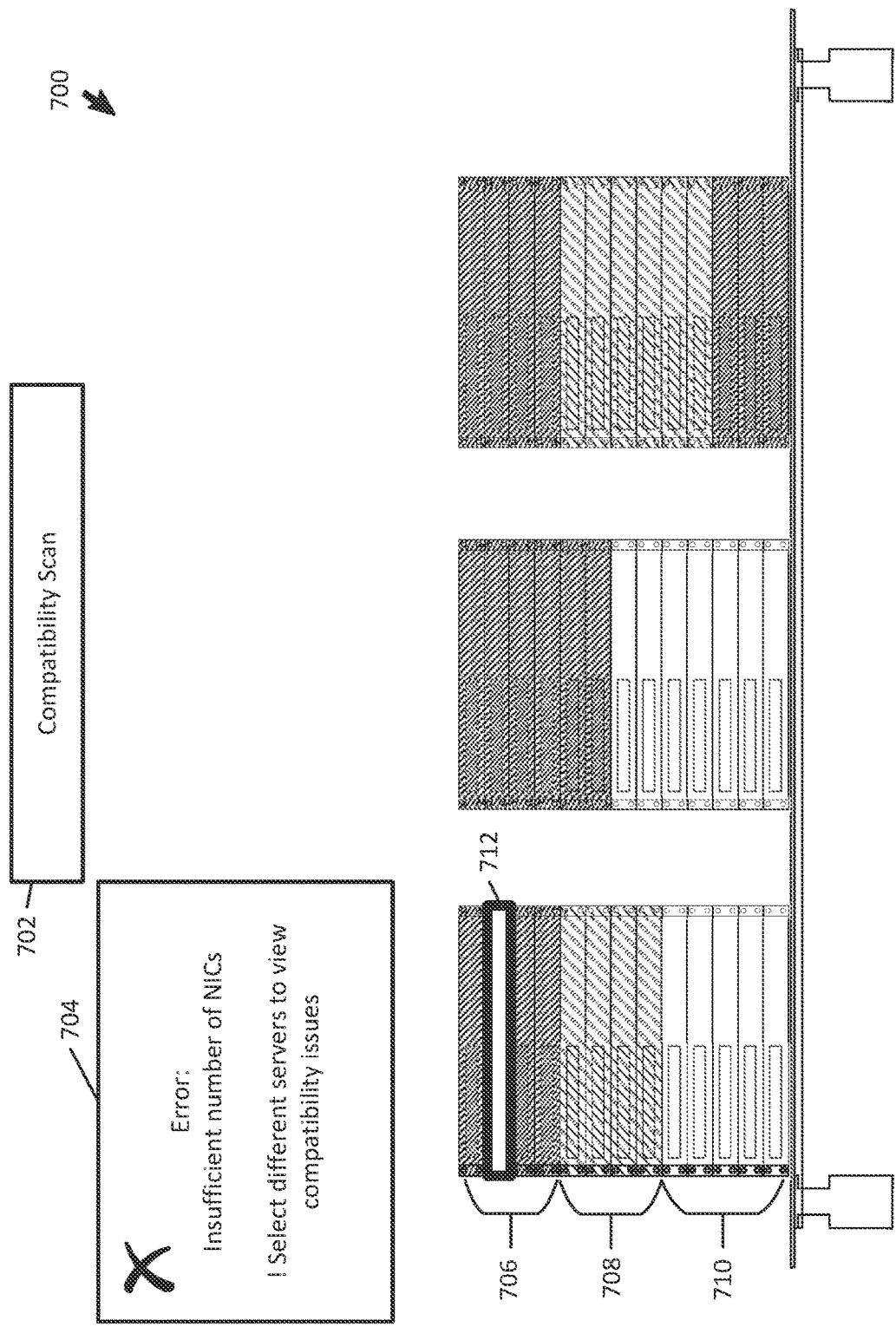

FIGS. 6-8 illustrate screenshots of a graphic user interface associated with an example augmented reality device, according to an example of the present disclosure. For example, the screenshots may be representative of what the GUI 118 and/or the display 128 of the AR device 102 may output when the AR device 102 performs one or more functions described herein. Specifically, FIGS. 6 and 7 illustrate the results of an example compatibility assessment (e.g., compatibility scan), whereas FIG. 8 illustrate a GUI 118 that provides device update and other options to a user for interacting with one or more computing devices (e.g., firmware). All three screenshots are that of an augmented video and/or image, since annotation labels (including headers) have been placed on the actual field of view 161.

Referring to FIG. 6, the example screenshot 600 illustrates that a compatibility scan has been performed (e.g., via the header indicating "compatibility scan" 602) for one or more computing devices (e.g., shown as stacks of firmware placed on a platform). The illustrated screenshot 600 comprises an actual field of view 161 comprising the stacks of firmware, with annotation labels that distinguish groups of firmware from one another based on their compatibility with a planned software deployment. For example, marker 606 shows a group of firmware that has been annotated as having a low compatibility value (e.g., these firmware may be incompatible with the proposed software deployment). Marker 608 shows a group of firmware that has been annotated as having a medium compatibility value (e.g., these firmware may be somewhat compatible with the proposed software deployment). Marker 608 shows a group of firmware that has been annotated as having a high compatibility value (e.g., these firmware are compatible with the proposed software deployment). As shown in FIG. 6, the annotation labels shown by markers 606, 608, and 610 may be color coded to indicate the compatibility value. The user may be able to determine a cause for, or additional information concerning, the respective compatibility value for a computing device. For example, the user may be able to select a firmware shown in marker 612, and read an annotation label shown by marker 604, which indicates that performance of a software on the selected firmware could be degraded due to lack of sufficient RAM. As shown by marker 604, compatibility values may indicate how compatible a software is with a computing device not only for the deployment of the software but also for its performance.

Referring to FIG. 7, the example screenshot 700 also illustrates that a compatibility scan has been performed (e.g., via the header indicating "compatibility scan" 702) for one or more computing devices (e.g., shown as the stacks of firmware placed on a platform). Markers 706, 708, and 710, like markers 606, 608, and 610 in FIG. 6, also show color coded annotation labels placed on the various firmware to indicate their compatibility value as it relates to their compatibility with a software to be deployed. However, FIG. 7 shows that the user has selected a firmware shown by marker 712 as being annotated as having low compatibility value (see dark contrast). Selecting that firmware allows the user to view an associated annotation label shown by marker 704, which indicates that the firmware has an insufficient number of network interface controllers (NICs).

Referring to FIG. 8, the example screenshot 800 illustrates a GUI 118 that provides options to a user for identifying and interacting with one or more computing devices (e.g., firmware). For example, a user of the AR device 102 may determine that a desired target computing device (e.g., as shown by marker 810) is not sufficiently compatible for a planned software deployment. As shown in FIG. 8, the desired firmware is marked by an annotation label indicating only a moderate compatibility value. As previously discussed, the AR device may determine and identify any device updates or installations that could be performed on the desired target computing device, e.g., to make it more compatible for the planned software deployment. As shown in FIG. 8, the GUI 118 shows that the user is provided options for interacting with a selected firmware (e.g., as shown by the header "Interact with firmware?" 802). It is contemplated that there may be other ways of interacting with the one or more computing devices besides performing device updates, and such other options may also may be provided (e.g., displayed to the user as options under marker 802). For example, the user may be provided options to install new plug-in, drivers, applications, and software. As shown in FIG. 8, the user is provided with several device update options (e.g., "V2.0.0" 804, "V1.1.0" 806 and "V1.0.0" 808). The GUI 118 may also indicate to the user if a specific device update has already been installed (e.g., as shown by marker 806). The user may select a device update option and may select a target computing device for the device update to be performed, e.g., by dragging the icon corresponding to the device update option (e.g., "V2.0.0" 804) and dragging it to the visual space corresponding to the desired computing device 810. As previously discussed, a server associated with the device update file may network with the computing device and initiate the device update accordingly.

Figure 9:
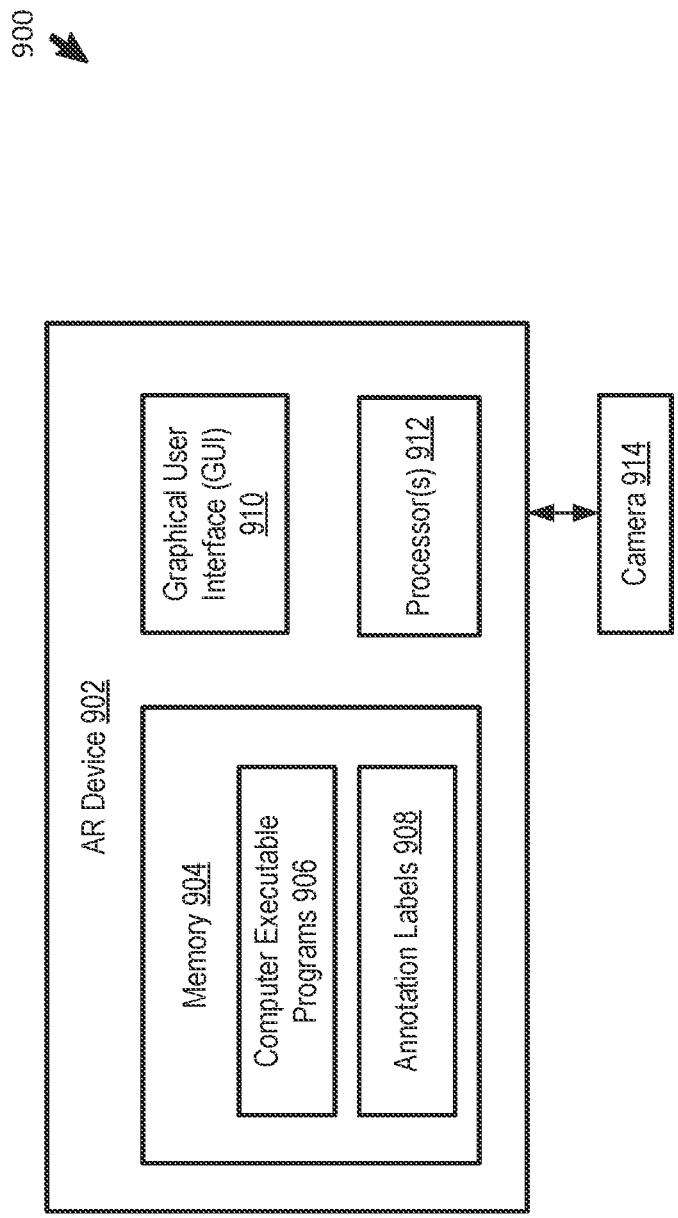
FIG. 9 illustrates a block diagram of an example computer system for providing context for software deployments using augmented reality, according to an example embodiment of the present disclosure.

FIG. 9 illustrates a block diagram of an example computer system 900 for providing context for software deployments using augmented reality, according to an example embodiment of the present disclosure. An example of the computer system 900 may comprise an augmented reality (AR) device 902. The AR device 902 may comprise one or more components of AR device 102, as shown in FIG. 1, and may perform one or more processes as shown in FIGS. 2-5. For example, the AR device 902 may include memory 904, a graphical user interface 910, and one or more processors 912. The GUI 910 may allow a user to view a video output from the camera, view augmented video, and enter input signals, e.g., by touching and moving icons on the display. Furthermore, the AR device 902 may comprise, or at least be communicatively linked to, a camera 914 to capture a field of view (e.g., to generate and/or augment a video).

The memory 904 may store instructions that, when executed by the processor 912, can cause the AR device 902 to perform one or more methods discussed herein. Furthermore, the memory may store one or more computer executable programs 906, such as any software code, unit, module, and/or programs that may be desired to be deployed to one or more other computing devices. Each computer executable program may have a set of compatibility requirements for it to be successfully deployed to a computing device. Furthermore, the memory 904 may store a plurality of annotation labels 908, e.g., for the annotating image data to create an augmented video.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st example aspect of the present disclosure, a method comprises receiving, by an augmented reality (AR) device having one or more processors, a set of compatibility requirements for deployment of a computer executable program; acquiring, using a camera associated with the AR device, image data of a first video showing one or more computing devices; determining, by the AR device, one or more device identifiers corresponding to the one or more computing devices; receiving, based on the one or more device identifiers, one or more device specifications corresponding to the one or more computing devices; determining, by the AR device and based on a comparison between the set of compatibility requirements with each of the one or more device specifications, a respective compatibility value of each computing device; generating one or more annotation labels corresponding to each computing device, wherein each annotation label indicates the respective compatibility value for each corresponding computing device; and generating, in real time based on the image data, an augmented video by mapping the one or more annotation labels to one or more visual spaces of the corresponding one or more computing devices.

In accordance with a 2nd example aspect of the present disclosure, which may be used in combination with any one or more of other aspects described herein (e.g., the 1st aspect), the method comprises: receiving a request to deploy the computer executable program at a first computing device of the one or more computing devices; generating, based on the comparison between the compatibility requirements with the respective device specification corresponding to the first computing device, an option for a device interaction; receiving, by the AR device, a user input selecting the option for the device interaction for the first computing device; and causing, based on the user input, the first computing device to receive the device interaction.

In accordance with a 3rd example aspect of the present disclosure, which may be used in combination with any one or more of other aspects described herein (e.g., the 2nd aspect), generating the option comprises: displaying, in real time, a visual indicator of the option on the augmented video, and wherein the receiving the user input selecting the option comprises: receiving, via a graphical user interface showing the augmented video, a signal caused by dragging the visual indicator of the option to the respective visual space of the first computing device.

In accordance with a 4th example aspect of the present disclosure, which may be used in combination with any one or more of other aspects described herein (e.g., the 1st aspect), the method comprises (e.g., prior to the receiving the one or more device notifications): transmitting, by the AR device and to a server, the one or more device identifiers; and causing retrieval, via a designated database associated with the server, the one or more device specifications corresponding to the one or more device identifiers, wherein the AR device receives the one or more device specifications from the server.

In accordance with a 5th example aspect of the present disclosure, which may be used in combination with any one or more of other aspects described herein (e.g., the 1st aspect), receiving the one or more device specifications comprises: sending, by the AR device, to the one or more computing devices, and via a communication network, a request for the respective device specification of each computing device; and receiving the respective device specification of each computing device.

In accordance with a 6th example aspect of the present disclosure, which may be used in combination with any one or more of other aspects described herein (e.g., the 1st aspect), determining the one or more device identifiers further comprises determining, via object recognition and from the image data, a barcode associated with each of the one or more computing devices, wherein each barcode encodes a device identifier of the one or more device identifiers; decoding, via a scanner associated with the AR device, the barcode associated with each of the one or more computing devices to generate the one or more device identifiers corresponding to the one or more computing devices.

In accordance with a 7th example aspect of the present disclosure, which may be used in combination with any one or more of other aspects described herein (e.g., the 1st aspect), determining the one or more device identifiers further comprises: receiving, via a radiofrequency identification (RFID) sensor associated with the AR device and from one or more RFID tags associated with the one or more computing devices, the one or more device identifiers, wherein the one or more RFID tags transmit corresponding one or more radiofrequencies that encode the respective device identifiers.

In accordance with an 8th example aspect of the present disclosure, which may be used in combination with any one or more of other aspects described herein (e.g., the 1st aspect), the method comprises: determining, by the AR device, that a compatibility value corresponding to a given computing device of the one or more computing devices does not satisfy a predetermined threshold; determining, by the AR device and based on the device specification corresponding to the given computing device, a device interaction to the given computing device; and causing display of a message prompting deployment of the device interaction to the given computing device.

In accordance with a 9th example aspect of the present disclosure, which may be used in combination with any one or more of other aspects described herein (e.g., the 1st aspect), an annotation label of the one or more annotation labels comprises a visual indicator of a cause for why a compatibility value corresponding to a given computing device does not satisfy a predetermined threshold.

In accordance with a 10th example aspect of the present disclosure, which may be used in combination with any one or more of other aspects described herein (e.g., the 9th aspect), the cause for why the compatibility value corresponding to the given computing device does not satisfy the predetermined threshold comprises one or more of: insufficient memory; an insufficient number of a hardware; a characteristic of a hardware; a characteristic of an operating system; or an insufficient processor speed.

In accordance with an 11th example aspect of the present disclosure, which may be used in combination with any one or more of other aspects described herein (e.g., the 1st aspect), the compatibility value indicates: no compatibility; a degree of compatibility; or full compatibility.

Aspects of the subject matter described herein may be useful alone or in combination with one or more other aspects described herein. In a 12th example aspect of the present disclosure, a system comprises: an augmented reality (AR) device comprising: a camera; a graphical user interface (GUI); one or more processors; and memory storing instructions that, when executed by the one or more processors, cause the AR device to: acquire, via the camera, image data of a first video showing one or more computing devices; provide, via the GUI, an option to deploy one or more computer executable programs into any of the one or more computing devices; receive, via the GUI, a request to deploy a first computer executable program of the one or more computer executable programs into a first computing device of the one or more computing devices, wherein the first computer executable program is associated with a set of compatibility requirements; display, in real-time, an augmented video showing a progress of deployment of the first computing executable program into the first computing device; determine that the first computing device fails to satisfy the set of compatibility requirements; and display, in real-time on the augmented video, an indication that the deployment has failed.

In accordance with a 13th example aspect of the present disclosure, which may be used in combination with any one or more of other aspects described herein (e.g., the 12th aspect), the instructions, when executed, further cause the AR device to: receive, via user input, a request for a cause for why the first computing device fails to satisfy the set of compatibility requirements; determine one or more compatibility requirements of the set of compatibility requirements that the first computing device fails to satisfy; and display, in real time on the augmented video, an annotation label indicating failure to meet the one or more compatibility requirements as the cause.

In accordance with a 14th example aspect of the present disclosure, which may be used in combination with any one or more of other aspects described herein (e.g., the 12th aspect), the receiving the request to deploy the first computer executable program into the first computing device comprises: receiving, via the GUI showing the augmented video, a signal caused by dragging a visual indicator of first computer executable program to a visual space of the first computing device.

In accordance with a 15th example aspect of the present disclosure, which may be used in combination with any one or more of other aspects described herein (e.g., the 12th aspect), the instructions, when executed, cause the AR device to: generate, based on a comparison between the set of compatibility requirements with a device specification of the first computing device, an option for a device interaction; receive, via the GUI, a user input selecting the option for the device interaction for the first computing device; and cause, based on the user input, the first computing device to receive the device interaction.

In accordance with a 16th example aspect of the present disclosure, which may be used in combination with any one or more of other aspects described herein (e.g., the 12th aspect), the instructions, when executed, cause the AR device to: after acquiring the image data: determine, based on a comparison between the set of compatibility requirements with a respective device specification for each of the one or more computing devices, a respective compatibility value for each computing device; generate one or more annotation labels corresponding to each computing device, wherein each annotation label indicates the respective compatibility value for each corresponding computing device; and display, in real-time on the augmented video, each annotation label overlaid on a visual space of the respective computing device.

In accordance with a 17th example aspect of the present disclosure, which may be used in combination with any one or more of other aspects described herein (e.g., the 15th aspect), generating the option comprises: displaying, in real time, a visual indicator of the option on the augmented video, and wherein the receiving the user input selecting the option comprises: receiving, via a graphical user interface showing the augmented video, a signal caused by dragging the visual indicator of the option to the respective visual space of the first computing device.

In accordance with a 18th example aspect of the present disclosure, which may be used in combination with any one or more of other aspects described herein (e.g., the 12th aspect), the instructions, when executed, cause the AR device to: transmit, to a server, one or more device identifiers; and cause retrieval, via a designated database associated with the server, the one or more device specifications corresponding to the one or more device identifiers, wherein the AR device receives the one or more device specifications from the server.

In accordance with a 19th example aspect of the present disclosure, which may be used in combination with any one or more of other aspects described herein (e.g., the 12th aspect), the instructions, when executed, cause the AR device to: send, to the one or more computing devices, and via a communication network, a request for a respective device specification of each computing device; and receive the respective device specification of each computing device.

In accordance with a 20th example aspect of the present disclosure, which may be used in combination with any one or more of other aspects described herein (e.g., the 12th aspect), the instructions, when executed, cause the AR device to: determine, via object recognition and from the image data, a barcode associated with each of the one or more computing devices, wherein each barcode encodes a device identifier of the one or more device identifiers; and decode, via a scanner associated with the AR device, the barcode associated with each of the one or more computing devices to generate the one or more device identifiers corresponding to the one or more computing devices.

In accordance with a 21st example aspect of the present disclosure, which may be used in combination with any one or more of other aspects described herein (e.g., the 12th aspect), the instructions, when executed, cause the AR device to: receive, via a radiofrequency identification (RFID) sensor associated with the AR device and from one or more RFID tags associated with the one or more computing devices, one or more device identifiers, wherein the one or more RFID tags transmit corresponding one or more radiofrequencies that encode the respective device identifiers.

In accordance with a 22nd example aspect of the present disclosure, which may be used in combination with any one or more of other aspects described herein (e.g., the 12th aspect), the instructions, when executed, cause the AR device to: determine that a compatibility value corresponding to a given computing device of the one or more computing devices does not satisfy a predetermined threshold; determine, based on the device specification corresponding to the given computing device, a device interaction to the given computing device; and cause display of a message prompting deployment of the device interaction to the given computing device.

In accordance with a 23rd example aspect of the present disclosure, which may be used in combination with any one or more of other aspects described herein (e.g., the 12th aspect), an annotation label of the one or more annotation labels comprises a visual indicator of a cause for why a compatibility value corresponding to a given computing device does not satisfy a predetermined threshold.

In accordance with a 24th example aspect of the present disclosure, which may be used in combination with any one or more of other aspects described herein (e.g., the 23rd aspect), the cause for why the compatibility value corresponding to the given computing device does not satisfy the predetermined threshold comprises one or more of: insufficient memory; an insufficient number of a hardware; a characteristic of a hardware; a characteristic of an operating system; or an insufficient processor speed.

In accordance with a 25th example aspect of the present disclosure, which may be used in combination with any one or more of other aspects described herein (e.g., the 12th aspect), the compatibility value indicates: no compatibility; a degree of compatibility; or full compatibility.

Aspects of the subject matter described herein may be useful alone or in combination with one or more other aspects described herein. In a 26th example aspect of the present disclosure, a non-transitory computer readable medium for use on a computer system containing computer-executable programming instructions for assessing hardware compatibility in real time using an augmented reality (AR) device, the method comprising: receiving, by the AR device, a set of compatibility requirements for deployment of a computer executable program; acquiring, using a camera associated with the AR device, image data of a first video showing one or more computing devices; determining, by the AR device, one or more device identifiers corresponding to the one or more computing devices; receiving, based on the one or more device identifiers, one or more device specifications corresponding to the one or more computing devices; determining, by the AR device and based on a comparison between the set of compatibility requirements with each of the one or more device specifications, a respective compatibility value of each computing device; generating one or more annotation labels corresponding to each computing device, wherein each annotation label indicates the respective compatibility value for each corresponding computing device; and generating, in real time based on the image data, an augmented video by mapping the one or more annotation labels to one or more visual spaces of the corresponding one or more computing devices.

In accordance with a 27th example aspect of the present disclosure, which may be used in combination with any one or more of other aspects described herein (e.g., the 26th aspect), the method comprises: receiving a request to deploy the computer executable program at a first computing device of the one or more computing devices; generating, based on the comparison between the compatibility requirements with the respective device specification corresponding to the first computing device, an option for a device interaction; receiving, by the AR device, a user input selecting the option for the device interaction for the first computing device; and causing, based on the user input, the first computing device to receive the device interaction.

In accordance with a 28th example aspect of the present disclosure, which may be used in combination with any one or more of other aspects described herein (e.g., the 26th aspect), the method comprises: determining, by the AR device, that a respective compatibility value for a given computing device does not satisfy a predetermined threshold; determining, by the AR device and based on the device specification corresponding to the given computing device, a device interaction to the given computing device; and causing display of a message prompting deployment of the device interaction to the given computing device.

In accordance with a 29th example aspect of the present disclosure, which may be used in combination with any one or more of other aspects described herein (e.g., the 26th aspect), the annotation label of the one or more annotation labels comprises a visual indicator of a cause for why a compatibility value for a given computing device does not satisfy the predetermined threshold.

In accordance with a 30th example aspect of the present disclosure, which may be used in combination with any one or more of other aspects described herein (e.g., the 27th aspect), generating the option comprises: displaying, in real time, a visual indicator of the option on the augmented video, and wherein the receiving the user input selecting the option comprises: receiving, via a graphical user interface showing the augmented video, a signal caused by dragging the visual indicator of the option to the respective visual space of the first computing device.

In accordance with a 31st example aspect of the present disclosure, which may be used in combination with any one or more of other aspects described herein (e.g., the 26th aspect), the method comprises (e.g., prior to the receiving the one or more device notifications): transmitting, by the AR device and to a server, the one or more device identifiers; and causing retrieval, via a designated database associated with the server, the one or more device specifications corresponding to the one or more device identifiers, wherein the AR device receives the one or more device specifications from the server.

In accordance with a 32nd example aspect of the present disclosure, which may be used in combination with any one or more of other aspects described herein (e.g., the 26th aspect), receiving the one or more device specifications comprises: sending, by the AR device, to the one or more computing devices, and via a communication network, a request for the respective device specification of each computing device; and receiving the respective device specification of each computing device.

In accordance with a 33rd example aspect of the present disclosure, which may be used in combination with any one or more of other aspects described herein (e.g., the 26th aspect), determining the one or more device identifiers further comprises determining, via object recognition and from the image data, a barcode associated with each of the one or more computing devices, wherein each barcode encodes a device identifier of the one or more device identifiers; decoding, via a scanner associated with the AR device, the barcode associated with each of the one or more computing devices to generate the one or more device identifiers corresponding to the one or more computing devices.

In accordance with a 34th example aspect of the present disclosure, which may be used in combination with any one or more of other aspects described herein (e.g., the 26th aspect), determining the one or more device identifiers further comprises: receiving, via a radiofrequency identification (RFID) sensor associated with the AR device and from one or more RFID tags associated with the one or more computing devices, the one or more device identifiers, wherein the one or more RFID tags transmit corresponding one or more radiofrequencies that encode the respective device identifiers.

In accordance with a 35th example aspect of the present disclosure, which may be used in combination with any one or more of other aspects described herein (e.g., the 29th aspect), the cause for why the compatibility value corresponding to the given computing device does not satisfy the predetermined threshold comprises one or more of: insufficient memory; an insufficient number of a hardware; a characteristic of a hardware; a characteristic of an operating system; or an insufficient processor speed.

In accordance with a 36th example aspect of the present disclosure, which may be used in combination with any one or more of other aspects described herein (e.g., the 26th aspect), the compatibility value indicates: no compatibility; a degree of compatibility; or full compatibility.

Aspects of the subject matter described herein may be useful alone or in combination with one or more other aspects described herein. In a 37th example aspect of the present disclosure, a system comprises: a means for acquiring image data of a first video showing one or more computing devices; a means for providing an option to deploy one or more computer executable programs into any of the one or more computing devices; a means for receiving a request to deploy a first computer executable program of the one or more computer executable programs into a first computing device of the one or more computing devices, wherein the first computer executable program is associated with a set of compatibility requirements; a means for displaying, in real-time, an augmented video showing a progress of deployment of the first computing executable program into the first computing device; a means for determining that the first computing device fails to satisfy the set of compatibility requirements; and a means for displaying, in real-time on the augmented video, an indication that the deployment has failed. The means may include one or more processors; and a means for storing instructions that, when executed by the one or more processors, cause the system to perform the aforementioned steps. The one or more processors and memory may be associated with an augmented reality (AR) device and/or a server. The means may further include a camera, display, and/or other periphery associated with an augmented reality (AR) device (e.g., to acquire image data and displaying the augmented video). The means may further comprise an application, application program interface (API), or a graphical user interface (GUI) associated with the application or API.

In accordance with a 38th example aspect of the present disclosure, which may be used in combination with any one or more of other aspects described herein (e.g., the 37th aspect), the system may further include a means for receiving, via user input, a request for a cause for why the first computing device fails to satisfy the set of compatibility requirements; determining one or more compatibility requirements of the set of compatibility requirements that the first computing device fails to satisfy; and displaying, in real time on the augmented video, an annotation label indicating failure to meet the one or more compatibility requirements as the cause. The means may include one or more processors; and memory storing instructions that, when executed by the one or more processors, cause the system to perform the aforementioned steps. The one or more processors and memory may be associated with an augmented reality (AR) device and/or a server. For example, the means may include comprise an application, application program interface (API), or a graphical user interface (GUI) associated with the application or API, e.g., to receive the request. The means may further include a camera, display, and/or other periphery associated with an augmented reality (AR) device (e.g., to display the annotation label).

In accordance with a 39th example aspect of the present disclosure, which may be used in combination with any one or more of other aspects described herein (e.g., the 37th aspect), the receiving the request to deploy the first computer executable program into the first computing device comprises: receiving, via the GUI showing the augmented video, a signal caused by dragging a visual indicator of first computer executable program to a visual space of the first computing device. The means may include one or more processors; and memory storing instructions that, when executed by the one or more processors, cause the system to perform the aforementioned steps.

In accordance with a 40th example aspect of the present disclosure, which may be used in combination with any one or more of other aspects described herein (e.g., the 37th aspect), the system includes a means for generating, based on a comparison between the set of compatibility requirements with a device specification of the first computing device, an option for a device interaction; receiving a user input selecting the option for the device interaction for the first computing device; and causing, based on the user input, the first computing device to receive the device interaction. The means may include one or more processors; and memory storing instructions that, when executed by the one or more processors, cause the system to perform the aforementioned steps.

In accordance with a 41st example aspect of the present disclosure, which may be used in combination with any one or more of other aspects described herein (e.g., the 37th aspect), system further includes a means for: after acquiring the image data: determining, based on a comparison between the set of compatibility requirements with a respective device specification for each of the one or more computing devices, a respective compatibility value for each computing device; generate one or more annotation labels corresponding to each computing device, wherein each annotation label indicates the respective compatibility value for each corresponding computing device; and displaying, in real-time on the augmented video, each annotation label overlaid on a visual space of the respective computing device. The means may include one or more processors; and memory storing instructions that, when executed by the one or more processors, cause the system to perform the aforementioned steps. The one or more processors and memory may be associated with an augmented reality (AR) device and/or a server. For example, the means may include comprise a display and/or a graphical user interface (GUI) associated with the application or API, e.g., to display each annotation label.

In accordance with a 42nd example aspect of the present disclosure, which may be used in combination with any one or more of other aspects described herein (e.g., the 40th aspect), generating the option comprises: displaying, in real time, a visual indicator of the option on the augmented video, and wherein the receiving the user input selecting the option comprises: receiving, via a graphical user interface showing the augmented video, a signal caused by dragging the visual indicator of the option to the respective visual space of the first computing device.

In accordance with a 43rd example aspect of the present disclosure, which may be used in combination with any one or more of other aspects described herein (e.g., the 37th aspect), the system includes a means for: transmitting (e.g., to a server), one or more device identifiers; and causing retrieval, via a designated database associated with the server, the one or more device specifications corresponding to the one or more device identifiers, wherein the AR device receives the one or more device specifications from the server. The means may include one or more processors; and memory storing instructions that, when executed by the one or more processors, cause the system to perform the aforementioned steps. The one or more processors and memory may be associated with an augmented reality (AR) device and/or the server.

In accordance with a 44th example aspect of the present disclosure, which may be used in combination with any one or more of other aspects described herein (e.g., the 37th aspect), the system includes a means for: sending, to the one or more computing devices, and via a communication network, a request for a respective device specification of each computing device; and receiving the respective device specification of each computing device. The means may include one or more processors; and memory storing instructions that, when executed by the one or more processors, cause the system to perform the aforementioned steps. The one or more processors and memory may be associated with an augmented reality (AR) device and/or a server.

In accordance with a 45th example aspect of the present disclosure, which may be used in combination with any one or more of other aspects described herein (e.g., the 37th aspect), the system may include means for: determining, via object recognition and from the image data, a barcode associated with each of the one or more computing devices, wherein each barcode encodes a device identifier of the one or more device identifiers; and decoding, via a scanner associated with the AR device, the barcode associated with each of the one or more computing devices to generate the one or more device identifiers corresponding to the one or more computing devices. The means may include one or more processors; and memory storing instructions that, when executed by the one or more processors, cause the system to perform the aforementioned steps. The one or more processors and memory may be associated with an augmented reality (AR) device and/or a server.

In accordance with a 46th example aspect of the present disclosure, which may be used in combination with any one or more of other aspects described herein (e.g., the 37th aspect), system may include means for: receiving, via a radiofrequency identification (RFID) sensor associated with the AR device and from one or more RFID tags associated with the one or more computing devices, one or more device identifiers, wherein the one or more RFID tags transmit corresponding one or more radiofrequencies that encode the respective device identifiers. The means may include one or more processors; and memory storing instructions that, when executed by the one or more processors, cause the system to perform the aforementioned steps. The one or more processors and memory may be associated with an augmented reality (AR) device and/or a server.

In accordance with a 47th example aspect of the present disclosure, which may be used in combination with any one or more of other aspects described herein (e.g., the 37th aspect), system may include means for: determining that a compatibility value corresponding to a given computing device of the one or more computing devices does not satisfy a predetermined threshold; determining, based on the device specification corresponding to the given computing device, a device interaction to the given computing device; and causing display of a message prompting deployment of the device interaction to the given computing device. The means may include one or more processors; and memory storing instructions that, when executed by the one or more processors, cause the system to perform the aforementioned steps. The one or more processors and memory may be associated with an augmented reality (AR) device and/or a server.

In accordance with a 48th example aspect of the present disclosure, which may be used in combination with any one or more of other aspects described herein (e.g., the 37th aspect), an annotation label of the one or more annotation labels comprises a visual indicator of a cause for why a compatibility value corresponding to a given computing device does not satisfy a predetermined threshold.

In accordance with a 49th example aspect of the present disclosure, which may be used in combination with any one or more of other aspects described herein (e.g., the 48th aspect), the cause for why the compatibility value corresponding to the given computing device does not satisfy the predetermined threshold comprises one or more of: insufficient memory; an insufficient number of a hardware; a characteristic of a hardware; a characteristic of an operating system; or an insufficient processor speed.

In accordance with a 50th example aspect of the present disclosure, which may be used in combination with any one or more of other aspects described herein (e.g., the 37th aspect), the compatibility value indicates: no compatibility; a degree of compatibility; or full compatibility.

It should be understood that various changes and modifications to the example embodiments described herein will be apparent to those skilled in the art. Such changes and modifications can be made without departing from the spirit The invention is claimed as follows:

1. A method comprising:
receiving, by an augmented reality (AR) device having one or more processors, a set of compatibility requirements for deployment of a computer executable program;
acquiring, using a camera associated with the AR device, image data of a first video showing one or more computing devices;
determining, by the AR device, one or more device identifiers corresponding to the one or more computing devices;
receiving, based on the one or more device identifiers, one or more device specifications corresponding to the one or more computing devices;
determining, by the AR device and based on a comparison between the set of compatibility requirements with each of the one or more device specifications, a respective compatibility value of each computing device;
generating one or more annotation labels corresponding to each computing device, wherein each annotation label indicates the respective compatibility value for each corresponding computing device;
generating, in real time based on the image data, an augmented video by mapping the one or more annotation labels to one or more visual spaces of the corresponding one or more computing devices;
receiving a request to deploy the computer executable program at a first computing device of the one or more computing devices;
generating, based on the comparison between the compatibility requirements with the respective device specification corresponding to the first computing device, an option for a device interaction;
receiving, by the AR device, a user input selecting the option for the device interaction for the first computing device; and
causing, based on the user input, the first computing device to receive the device interaction.

2. The method of claim 1,
wherein the generating the option comprises:
displaying, in real time, a visual indicator of the option on the augmented video, and
wherein the receiving the user input selecting the option comprises:
receiving, via a graphical user interface showing the augmented video, a signal caused by dragging the visual indicator of the option to the respective visual space of the first computing device.

3. The method of claim 1, further comprising, prior to the receiving the one or more device specifications:
transmitting, by the AR device and to a server, the one or more device identifiers; and
causing retrieval, via a designated database associated with the server, the one or more device specifications corresponding to the one or more device identifiers, wherein the AR device receives the one or more device specifications from the server.

4. The method of claim 1,
wherein the receiving the one or more device specifications comprises:
sending, by the AR device, to the one or more computing devices, and via a communication network, a request for the respective device specification of each computing device; and
receiving the respective device specification of each computing device.

5. The method of claim 1, wherein the determining the one or more device identifiers further comprises:
determining, via object recognition and from the image data, a barcode associated with each of the one or more computing devices, wherein each barcode encodes a device identifier of the one or more device identifiers; and
decoding, via a scanner associated with the AR device, the barcode associated with each of the one or more computing devices to generate the one or more device identifiers corresponding to the one or more computing devices.

6. The method of claim 1, wherein the determining the one or more device identifiers further comprises:
receiving, via a radiofrequency identification (RFID) sensor associated with the AR device and from one or more RFID tags associated with the one or more computing devices, the one or more device identifiers, wherein the one or more RFID tags transmit corresponding one or more radiofrequencies that encode the respective device identifiers.

7. The method of claim 1, further comprising:
receiving, by the AR device, an indication that a compatibility value corresponding to a given computing device of the one or more computing devices does not satisfy a predetermined threshold;
determining, by the AR device and based on the device specification corresponding to the given computing device, a device interaction to the given computing device; and
causing display of a message prompting deployment of the device interaction to the given computing device.

8. The method of claim 1, wherein an annotation label of the one or more annotation labels comprises a visual indicator of a cause for why a compatibility value corresponding to a given computing device does not satisfy a predetermined threshold.

9. The method of claim 8, wherein the cause comprises one or more of:
insufficient memory;
an insufficient number of a hardware;
a characteristic of a hardware;
a characteristic of an operating system; or
an insufficient processor speed.

10. The method of claim 1, wherein the compatibility value indicates:
no compatibility;
a degree of compatibility; or
full compatibility.

11. A system comprising:
an augmented reality (AR) device comprising:
a camera;
a graphical user interface (GUI);
one or more processors; and
memory storing instructions that, when executed by the one or more processors, cause the AR device to:
acquire, via the camera, image data of a first video showing one or more computing devices;
provide, via the GUI, an option to deploy one or more computer executable programs into any of the one or more computing devices;
receive, via the GUI, a request to deploy a first computer executable program of the one or more computer executable programs into a first computing device of the one or more computing devices, wherein the first computer executable program is associated with a set of compatibility requirements;

display, in real-time, an augmented video showing a progress of deployment of the first computing executable program into the first computing device;

determine that the first computing device fails to satisfy the set of compatibility requirements; and display, in real-time on the augmented video, an indication that the deployment has failed.

12. The system of claim 11, wherein the instructions, when executed, further cause the AR device to:

receive, via user input, a request for a cause for why the first computing device fails to satisfy the set of compatibility requirements;

determine one or more compatibility requirements of the set of compatibility requirements that the first computing device fails to satisfy; and display, in real time on the augmented video, an annotation label indicating failure to meet the one or more compatibility requirements as the cause.

13. The system of claim 11, wherein the receiving the request to deploy the first computer executable program into the first computing device comprises:

receiving, via the GUI showing the augmented video, a signal caused by dragging a visual indicator of first computer executable program to a visual space of the first computing device.

14. The system of claim 11, wherein the instructions, when executed, further cause the AR device to:

generate, based on a comparison between the set of compatibility requirements with a device specification of the first computing device, an option for a device interaction;

receive, via the GUI, a user input selecting the option for the device interaction for the first computing device; and cause, based on the user input, the first computing device to receive the device interaction.

15. The system of claim 11, wherein the instructions, when executed, further cause the AR device to, after acquiring the image data:

determine, based on a comparison between the set of compatibility requirements with a respective device specification for each of the one or more computing devices, a respective compatibility value for each computing device;

generate one or more annotation labels corresponding to each computing device, wherein each annotation label indicates the respective compatibility value for each corresponding computing device; and display, in real-time on the augmented video, each annotation label overlaid on a visual space of the respective computing device.

16. A non-transitory computer readable medium for use on a computer system containing computer-executable programming instructions which, when executed by at least one processor, cause the computer system to implement a method for assessing hardware compatibility in real time using an augmented reality (AR) device, the method comprising:

receiving, by the AR device, a set of compatibility requirements for deployment of a computer executable program;

acquiring, using a camera associated with the AR device, image data of a first video showing one or more computing devices;

determining, by the AR device, one or more device identifiers corresponding to the one or more computing devices;

receiving, based on the one or more device identifiers, one or more device specifications corresponding to the one or more computing devices;

determining, by the AR device and based on a comparison between the set of compatibility requirements with each of the one or more device specifications, a respective compatibility value of each computing device;

generating one or more annotation labels corresponding to each computing device, wherein each annotation label indicates the respective compatibility value for each corresponding computing device;

generating, in real time based on the image data, an augmented video by mapping the one or more annotation labels to one or more visual spaces of the corresponding one or more computing devices;

receiving a request to deploy the computer executable program at a first computing device of the one or more computing devices;

generating, based on the comparison between the compatibility requirements with the respective device specification corresponding to the first computing device, an option for a device interaction;

receiving, by the AR device, a user input selecting the option for the device interaction for the first computing device; and causing, based on the user input, the first computing device to receive the device interaction.

17. The non-transitory computer readable medium of claim 16, wherein the method further comprises:

determining, by the AR device, that a respective compatibility value for a given computing device does not satisfy a predetermined threshold;

determining, by the AR device and based on the device specification corresponding to the given computing device, a device interaction to the given computing device; and causing display of a message prompting deployment of the device interaction to the given computing device.

18. The non-transitory computer readable medium of claim 16, wherein an annotation label of the one or more annotation labels comprises a visual indicator of a cause for why a compatibility value for a given computing device does not satisfy the predetermined threshold.

* * * * *